(12) United States Patent
Sellers et al.

(10) Patent No.: US 7,793,233 B1
(45) Date of Patent: Sep. 7, 2010

(54) SYSTEM AND METHOD FOR CUSTOMIZING NOTE FLAGS

(75) Inventors: Timothy D. Sellers, Bellevue, WA (US); Myungsub Kim, Redmond, WA (US); Jeffry N. Cardon, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 10/387,287

(22) Filed: Mar. 12, 2003

(51) Int. Cl.
- G06F 3/048 (2006.01)
- G06F 3/033 (2006.01)
- G06F 17/00 (2006.01)

(52) U.S. Cl. .................. 715/805; 715/863; 715/780
(58) Field of Classification Search ........... 715/805, 715/781
See application file for complete search history.

(56) References Cited

U.S. PATENT DOCUMENTS

| | | | |
|---|---|---|---|
| 5,202,828 A * | 4/1993 | Vertelney et al. | 715/530 |
| 5,493,692 A | 2/1996 | Theimer et al. | |
| 5,530,794 A | 6/1996 | Luebbert | 715/524 |
| 5,537,628 A | 7/1996 | Luebbert | 715/524 |
| 5,544,321 A | 8/1996 | Theimer et al. | |
| 5,555,376 A | 9/1996 | Theimer et al. | |
| 5,563,996 A * | 10/1996 | Tchao | 715/521 |
| 5,596,656 A * | 1/1997 | Goldberg | 382/186 |
| 5,603,054 A | 2/1997 | Theimer et al. | |
| 5,611,050 A | 3/1997 | Theimer et al. | |
| 5,625,783 A | 4/1997 | Ezekiel et al. | 395/352 |
| 5,625,810 A | 4/1997 | Kurosu et al. | 707/1 |
| 5,701,424 A | 12/1997 | Atkinson | 715/808 |
| 5,724,595 A | 3/1998 | Gentner | 715/206 |
| 5,734,915 A | 3/1998 | Roewer | 395/773 |
| 5,752,254 A | 5/1998 | Sakairi | 715/530 |
| 5,760,768 A | 6/1998 | Gram | 345/333 |
| 5,761,683 A | 6/1998 | Logan et al. | 715/206 |

(Continued)

FOREIGN PATENT DOCUMENTS

EP 0569133 A2 11/1993

(Continued)

OTHER PUBLICATIONS

Kamel et al., Retrieving Electronic Ink By Content, Multimedia Database Management Systems, 1996., Proceedings of International Workshop on Aug. 14-16, 1996 pp. 54-61.*

(Continued)

Primary Examiner—William L Bashore
Assistant Examiner—Jordany Núñez
(74) Attorney, Agent, or Firm—Merchant & Gould, P.C.

(57) ABSTRACT

A method and system for customizing note flags allows a user to change the look or "feel" of a note flag. A user can be provided with several options in order to create note flags that are visually distinguishable from one another. In this way, the note flags can be used to visually distinguish a first note or first set of notes from a second note or second set of notes. The method and system can also link note flags with a particular action or operation within a document editing module or with action or an operation in another application program relative to a document editing module. In other words, a note flag can initiate an operation in another application program or within the document editing module (or both) when a particular note flag is selected by a user.

20 Claims, 10 Drawing Sheets

U.S. PATENT DOCUMENTS

| | | | |
|---|---|---|---|
| 5,765,156 A | 6/1998 | Guzak et al. | 707/100 |
| 5,778,346 A | 7/1998 | Frid-Nielsen et al. | 705/9 |
| 5,781,192 A | 7/1998 | Kodimer | 715/770 |
| 5,798,760 A | 8/1998 | Vayda et al. | 715/834 |
| 5,801,693 A | 9/1998 | Bailey | 715/769 |
| 5,812,865 A | 9/1998 | Theimer et al. | |
| 5,838,321 A | 11/1998 | Wolf | 345/343 |
| 5,855,006 A | 12/1998 | Huemoeller et al. | 705/9 |
| 5,870,552 A | 2/1999 | Dozier et al. | 715/234 |
| 5,884,306 A | 3/1999 | Bliss et al. | 707/7 |
| 5,898,434 A * | 4/1999 | Small et al. | 715/810 |
| 5,924,099 A | 7/1999 | Guzak et al. | 707/100 |
| 5,940,078 A | 8/1999 | Nagarajayya et al. | 345/346 |
| 5,958,008 A | 9/1999 | Pogrebisky et al. | 709/223 |
| 5,970,455 A | 10/1999 | Wilcox et al. | 704/270 |
| 5,970,466 A | 10/1999 | Detjen et al. | 705/8 |
| 5,999,938 A | 12/1999 | Bliss et al. | 707/102 |
| 6,002,402 A | 12/1999 | Schacher | 715/810 |
| 6,025,837 A | 2/2000 | Matthews, III et al. | 715/721 |
| 6,034,686 A | 3/2000 | Lamb et al. | 715/810 |
| 6,057,845 A * | 5/2000 | Dupouy | 715/863 |
| 6,065,012 A | 5/2000 | Balsara et al. | 707/102 |
| 6,177,939 B1 | 1/2001 | Blish et al. | 715/770 |
| 6,233,591 B1 | 5/2001 | Sherman et al. | 715/205 |
| 6,249,283 B1 | 6/2001 | Ur | 715/764 |
| 6,262,724 B1 | 7/2001 | Crow et al. | 715/723 |
| 6,269,389 B1 | 7/2001 | Ashe | 718/100 |
| 6,275,940 B1 | 8/2001 | Edwards et al. | 713/200 |
| 6,278,450 B1 | 8/2001 | Arcuri et al. | 345/334 |
| 6,282,548 B1 | 8/2001 | Burner et al. | 715/234 |
| 6,308,201 B1 | 10/2001 | Pivowar et al. | 709/214 |
| 6,309,305 B1 | 10/2001 | Kraft | 455/566 |
| 6,310,622 B1 | 10/2001 | Assente | 345/441 |
| 6,310,634 B1 | 10/2001 | Bodnar et al. | 715/854 |
| 6,321,242 B1 | 11/2001 | Fogg et al. | 715/236 |
| 6,389,434 B1 | 5/2002 | Rivette et al. | 715/209 |
| 6,411,311 B1 | 6/2002 | Rich et al. | 715/769 |
| 6,429,882 B1 | 8/2002 | Abdelnur et al. | 345/763 |
| 6,433,801 B1 | 8/2002 | Moon et al. | 345/840 |
| 6,448,987 B1 | 9/2002 | Easty et al. | 714/834 |
| 6,459,441 B1 | 10/2002 | Perroux et al. | 345/837 |
| 6,466,232 B1 | 10/2002 | Newell et al. | |
| 6,490,634 B2 | 12/2002 | Coiner | 719/329 |
| 6,499,041 B1 | 12/2002 | Breslau et al. | 715/505 |
| 6,513,046 B1 | 1/2003 | Abbott, III et al. | |
| 6,549,219 B2 | 4/2003 | Selker | 715/834 |
| 6,549,915 B2 | 4/2003 | Abbott, III et al. | |
| 6,572,660 B1 | 6/2003 | Okamoto | 715/272 |
| 6,606,653 B1 | 8/2003 | Ackermann, Jr. et al. | 709/219 |
| 6,618,732 B1 | 9/2003 | White et al. | 707/103 |
| 6,651,059 B1 | 11/2003 | Sundaresan et al. | 707/6 |
| 6,686,938 B1 | 2/2004 | Jobs et al. | 345/835 |
| 6,694,087 B1 | 2/2004 | Weaver | 386/52 |
| 6,704,770 B1 | 3/2004 | Ramakesavan | 709/205 |
| 6,708,202 B1 | 3/2004 | Shuman et al. | 709/206 |
| 6,735,347 B1 | 5/2004 | Bates et al. | 382/282 |
| 6,747,675 B1 | 6/2004 | Abbott et al. | |
| 6,751,777 B2 | 6/2004 | Bates et al. | 715/206 |
| 6,763,496 B1 | 7/2004 | Hennings et al. | 715/205 |
| 6,789,228 B1 | 9/2004 | Merril et al. | 715/500.1 |
| 6,791,580 B1 | 9/2004 | Abbott et al. | |
| 6,801,223 B1 | 10/2004 | Abbott et al. | |
| 6,802,041 B1 | 10/2004 | Rehm | 715/201 |
| 6,810,405 B1 | 10/2004 | LaRue et al. | 707/201 |
| 6,812,937 B1 | 11/2004 | Abbott et al. | |
| 6,826,729 B1 | 11/2004 | Giesen et al. | 715/837 |
| 6,836,270 B2 | 12/2004 | Du | 345/419 |
| 6,842,877 B2 | 1/2005 | Robarts et al. | |
| 6,848,075 B1 | 1/2005 | Becker et al. | 715/205 |
| 6,918,091 B2 | 7/2005 | Leavitt et al. | 715/785 |
| 6,924,797 B1 | 8/2005 | MacPhail | 345/326 |
| 6,925,496 B1 | 8/2005 | Ingram et al. | 709/224 |
| 6,944,821 B1 | 9/2005 | Bates et al. | 715/530 |
| 6,970,867 B1 | 11/2005 | Hsu et al. | 707/4 |
| 7,032,210 B2 | 4/2006 | Alloing et al. | 717/106 |
| 7,039,234 B2 | 5/2006 | Geidl et al. | 382/187 |
| 7,114,128 B2 | 9/2006 | Koppolu et al. | 715/781 |
| 7,143,338 B2 | 11/2006 | Bauchot et al. | 715/503 |
| 7,165,098 B1 | 1/2007 | Boyer et al. | 709/219 |
| 7,184,955 B2 | 2/2007 | Obrador et al. | 704/231 |
| 7,185,050 B2 | 2/2007 | Eld et al. | 709/203 |
| 7,188,073 B1 | 3/2007 | Tam et al. | 705/9 |
| 7,210,107 B2 | 4/2007 | Wecker et al. | 715/883 |
| 7,254,785 B2 | 8/2007 | Reed | 715/834 |
| 7,406,501 B2 | 7/2008 | Szeto et al. | 709/206 |
| 7,454,763 B2 | 11/2008 | Veselova et al. | 719/329 |
| 7,460,713 B2 | 12/2008 | Lapstun et al. | 382/187 |
| 7,555,707 B1 | 6/2009 | Labarge et al. | 715/234 |
| 2001/0032214 A1 | 10/2001 | Bauchot et al. | 707/503 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0026478 A1 | 2/2002 | Rodgers et al. | 709/205 |
| 2002/0032689 A1 | 3/2002 | Abbott, III et al. | |
| 2002/0044152 A1 | 4/2002 | Abbott, III et al. | |
| 2002/0049785 A1 | 4/2002 | Bauchot | 707/503 |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078180 A1 | 6/2002 | Miyazawa | 709/219 |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087534 A1 | 7/2002 | Blackman et al. | 707/4 |
| 2002/0087642 A1 | 7/2002 | Wei et al. | 709/206 |
| 2002/0088008 A1 | 7/2002 | Markel | 725/135 |
| 2002/0089540 A1 | 7/2002 | Geier et al. | 345/764 |
| 2002/0091739 A1 | 7/2002 | Ferlitsch et al. | 707/526 |
| 2002/0099777 A1 | 7/2002 | Gupta et al. | 709/206 |
| 2002/0120697 A1 | 8/2002 | Generous et al. | 709/306 |
| 2002/0133520 A1 | 9/2002 | Tanner | 715/202 |
| 2002/0138582 A1 | 9/2002 | Chandra et al. | 709/206 |
| 2002/0140731 A1 | 10/2002 | Subramaniam et al. | 345/762 |
| 2002/0161800 A1 | 10/2002 | Eld et al. | 707/512 |
| 2002/0161804 A1 | 10/2002 | Chiu et al. | 707/530 |
| 2002/0184264 A1 | 12/2002 | Berg et al. | 707/513 |
| 2002/0196293 A1 | 12/2002 | Suppan et al. | 345/853 |
| 2003/0013483 A1 | 1/2003 | Ausems et al. | 455/556 |
| 2003/0014395 A1 | 1/2003 | Ruvolo et al. | 707/3 |
| 2003/0014490 A1 | 1/2003 | Bates et al. | 709/206 |
| 2003/0020749 A1 | 1/2003 | Abu-Hakima et al. | 345/752 |
| 2003/0023755 A1 | 1/2003 | Harris et al. | 709/246 |
| 2003/0046401 A1 | 3/2003 | Abbott et al. | |
| 2003/0050927 A1 | 3/2003 | Hussam | 707/5 |
| 2003/0069877 A1 | 4/2003 | Grefenstette et al. | 707/2 |
| 2003/0070143 A1 | 4/2003 | Maslov | 715/513 |
| 2003/0076352 A1 | 4/2003 | Uhlig et al. | 715/738 |
| 2003/0084104 A1 | 5/2003 | Salem et al. | 709/205 |
| 2003/0088534 A1 | 5/2003 | Kalantar et al. | 706/50 |
| 2003/0097361 A1 | 5/2003 | Huang et al. | 707/10 |
| 2003/0100999 A1 | 5/2003 | Markowitz | 702/20 |
| 2003/0135565 A1 | 7/2003 | Estrada | 709/206 |
| 2003/0154254 A1 | 8/2003 | Awasthi | 709/206 |
| 2003/0154476 A1 | 8/2003 | Abbott, III et al. | |
| 2003/0172168 A1 | 9/2003 | Mak et al. | 709/230 |
| 2003/0172384 A1 | 9/2003 | Comps | 370/474 |
| 2003/0182450 A1 | 9/2003 | Ong et al. | 709/246 |
| 2003/0187930 A1 | 10/2003 | Ghaffar et al. | 709/205 |
| 2003/0196196 A1 | 10/2003 | Nylander et al. | 711/159 |

| | | | |
|---|---|---|---|
| 2003/0212680 A1 | 11/2003 | Bates et al. .................... 707/7 |
| 2003/0222899 A1 | 12/2003 | Alvesalo ..................... 345/716 |
| 2004/0001093 A1 | 1/2004 | Sellers et al. ............... 345/766 |
| 2004/0039779 A1 | 2/2004 | Amstrong et al. ........... 709/204 |
| 2004/0054736 A1 | 3/2004 | Daniell et al. ............... 709/206 |
| 2004/0063400 A1 | 4/2004 | Kim ......................... 455/3.06 |
| 2004/0073679 A1 | 4/2004 | Martens et al. ............. 709/227 |
| 2004/0098398 A1 | 5/2004 | Ahn et al. ................... 707/100 |
| 2004/0109033 A1 | 6/2004 | Vienneau et al. ............ 345/863 |
| 2004/0128613 A1 | 7/2004 | Sinisi ........................ 715/500 |
| 2004/0153445 A1 | 8/2004 | Horvitz et al. ................. 707/3 |
| 2004/0158611 A1 | 8/2004 | Daniell et al. ............... 709/206 |
| 2004/0168119 A1 | 8/2004 | Liu et al. .................. 715/501.1 |
| 2004/0172455 A1 | 9/2004 | Green et al. ................ 709/207 |
| 2004/0174392 A1 | 9/2004 | Bjoernsen et al. ........... 345/751 |
| 2004/0177122 A1 | 9/2004 | Appelman et al. .......... 709/206 |
| 2004/0177319 A1 | 9/2004 | Horn ....................... 715/501.1 |
| 2004/0189694 A1 | 9/2004 | Kurtz et al. ................. 345/738 |
| 2004/0194025 A1 | 9/2004 | Hubert et al. ................ 715/513 |
| 2004/0221243 A1 | 11/2004 | Twerdahl et al. ............ 715/834 |
| 2004/0230599 A1 | 11/2004 | Moore et al. ................ 707/102 |
| 2004/0243677 A1 | 12/2004 | Curbow et al. .............. 709/206 |
| 2004/0243941 A1 | 12/2004 | Fish ........................... 715/752 |
| 2004/0267625 A1 | 12/2004 | Feng et al. .................... 705/26 |
| 2004/0267706 A1 | 12/2004 | Springer et al. ................ 707/3 |
| 2004/0268231 A1 | 12/2004 | Tunning ..................... 715/513 |
| 2004/0268263 A1 | 12/2004 | Van Dok et al. ............. 715/733 |
| 2005/0004989 A1 | 1/2005 | Satterfield et al. ........... 709/206 |
| 2005/0004990 A1 | 1/2005 | Durazo et al. ............... 709/206 |
| 2005/0005235 A1 | 1/2005 | Satterfield et al. ........... 715/245 |
| 2005/0005249 A1 | 1/2005 | Hill et al. .................... 715/810 |
| 2005/0010871 A1 | 1/2005 | Ruthfield et al. ............ 715/712 |
| 2005/0034078 A1 | 2/2005 | Abbott et al. |
| 2005/0055424 A1 | 3/2005 | Smith ......................... 709/219 |
| 2005/0064852 A1 | 3/2005 | Baldursson |
| 2005/0097465 A1 | 5/2005 | Giesen et al. ............... 715/700 |
| 2005/0102365 A1 | 5/2005 | Moore et al. ................ 709/207 |
| 2005/0102607 A1 | 5/2005 | Rouselle et al. .......... 715/501.1 |
| 2005/0102639 A1 | 5/2005 | Dove .......................... 717/178 |
| 2005/0108619 A1 | 5/2005 | Theall et al. ................ 715/229 |
| 2005/0114521 A1 | 5/2005 | Lee ............................ 709/228 |
| 2005/0119018 A1 | 6/2005 | Kim ........................... 455/466 |
| 2005/0125717 A1 | 6/2005 | Segal et al. ................. 715/512 |
| 2005/0149851 A1 | 7/2005 | Mittal ........................ 715/205 |
| 2005/0154761 A1 | 7/2005 | Lee et al. ................. 707/104.1 |
| 2005/0165795 A1 | 7/2005 | Myka et al. ................. 707/100 |
| 2005/0166154 A1 | 7/2005 | Wilson et al. ............... 715/751 |
| 2005/0175089 A1 | 8/2005 | Jung ....................... 375/240.03 |
| 2005/0183008 A1 | 8/2005 | Crider et al. ................ 715/517 |
| 2005/0208962 A1 | 9/2005 | Kim |
| 2005/0233744 A1 | 10/2005 | Karaoguz ................ 455/432.3 |
| 2005/0240590 A1 | 10/2005 | Shimizu et al. ................ 707/9 |
| 2005/0245241 A1 | 11/2005 | Durand ....................... 455/408 |
| 2005/0286414 A1 | 12/2005 | Young et al. ................ 370/216 |
| 2005/0289109 A1 | 12/2005 | Arrouye et al. ................ 707/1 |
| 2006/0024695 A1 | 2/2006 | Vander Horn et al. ........ 715/777 |
| 2006/0036945 A1 | 2/2006 | Radtke et al. ............... 715/708 |
| 2006/0036950 A1 | 2/2006 | Himberger et al. .......... 715/732 |
| 2006/0047704 A1 | 3/2006 | Gopalakrishnan ........ 707/104.1 |
| 2006/0053379 A1 | 3/2006 | Henderson et al. .......... 715/751 |
| 2006/0069603 A1 | 3/2006 | Williams et al. ............... 705/9 |
| 2006/0069604 A1 | 3/2006 | Leukart et al. ................. 705/9 |
| 2006/0069617 A1 | 3/2006 | Milener et al. ........... 715/501.1 |
| 2006/0075347 A1 | 4/2006 | Rehm ......................... 715/727 |
| 2006/0075360 A1 | 4/2006 | Bixler ......................... 715/805 |
| 2006/0095452 A1 | 5/2006 | Jansson et al. .............. 707/101 |
| 2006/0139709 A1 | 6/2006 | Bifano et al. ................ 358/527 |
| 2006/0150109 A1 | 7/2006 | Schultz et al. .............. 715/759 |
| 2006/0195461 A1 | 8/2006 | Lo et al. ..................... 707/100 |
| 2007/0022372 A1 | 1/2007 | Liu et al. .................... 715/201 |
| 2007/0124325 A1 | 5/2007 | Moore et al. ................ 707/102 |
| 2007/0156627 A1 | 7/2007 | D'Alicandro .................. 707/1 |
| 2007/0156643 A1 | 7/2007 | Sareen et al. ................... 707/2 |
| 2007/0168278 A1 | 7/2007 | Peterson et al. ............... 705/38 |
| 2007/0168378 A1 | 7/2007 | Sareen et al. ............... 707/102 |
| 2007/0245223 A1 | 10/2007 | Siedzik et al. .............. 715/203 |
| 2007/0245229 A1 | 10/2007 | Siedzik et al. .............. 715/205 |
| 2008/0115048 A1 | 5/2008 | Veselova et al. ............ 715/205 |
| 2008/0115069 A1 | 5/2008 | Veselova .................... 715/760 |

FOREIGN PATENT DOCUMENTS

| | | |
|---|---|---|
| EP | 0986011 A2 | 3/2000 |
| EP | 1223503 A2 | 7/2002 |
| EP | 1376337 A1 | 2/2004 |
| EP | 1630694 A2 | 3/2006 |
| GB | 2391148 A | 1/2004 |
| JP | 2001265753 A | 9/2001 |
| WO | WO9800787 A1 | 8/1998 |
| WO | WO2004038548 A2 | 5/2004 |
| WO | WO2004038548 A3 | 5/2004 |
| WO | WO2004038548 R4 | 5/2004 |
| WO | WO 2004086254 A1 | 10/2004 |
| WO | WO 2005001709 A2 | 1/2005 |
| WO | WO 2005067328 A1 | 7/2005 |
| WO | WO2005110010 A2 | 11/2005 |
| WO | WO 2007081783 A2 | 7/2007 |
| WO | WO 2007081783 A3 | 7/2007 |
| WO | WO 2007081786 A2 | 7/2007 |
| WO | WO 2007081786 A3 | 7/2007 |

OTHER PUBLICATIONS

U.S. Appl. No. 10/420,621, filed Apr. 22, 2003, entitled "Creation and Recognition of Specially-Marked Items in Notes".

U.S. Appl. No. 10/397,103, filed Mar. 27, 2003, entitled "System and Method for Linking Page Content with a Media File and Displaying the Links".

U.S. Appl. No. 10/664,740, filed Sep. 18, 2003, entitled "Method and System for Providing Data Reference Information".

U.S. Appl. No. 10/955,232, filed Sep. 30, 2004, entitled "Method and System for Improved Electronic Task Flagging and Management".

U.S. Appl. No. 11/063,309, filed Feb. 22, 2005, entitled "System and Method for Linking Page Content with a Video Media File and Displaying the Links".

U.S. Official Action mailed Oct. 19, 2004 in U.S. Appl. No. 10/397,103.

U.S. Official Action mailed Sep. 23, 2005 in U.S. Appl. No. 10/420,621.

U.S. Official Action mailed Mar. 6, 2006 in U.S. Appl. No. 10/664,740.

Microsoft Corporation, "Microsoft Snipping Tool for Tablet PC Preview Release Help: Capturing Clips; Capturing Regions; Displaying or Hiding Links", Nov. 2002, 4 pp.

Leszynski Group, "News Story: Leszynski Group Powers Bill Gates' Tablet PC Launch Keynote", Nov. 2002, 1 pp.

Leszynski Group, "Tablet PC Solutions", Nov. 2002, 3 pp.

IBM Corporation, "Dragging Marked Data to an Editor Window", Technical Disclosure Bulletin, Mar. 1992, vol. 34, No. 10B, pp. 202-203.

IBM Corporation, "Source Dimension Copying Using the Standard Clipboard", Technical Disclosure Bulletin, Aug. 1994, vol. 37, No. 8, pp. 419-420.

IBM Corporation, "Multiple Item On-Line Clipboard", Technical Disclosure Bulletin, Jul. 1992, No. 2, pp. 425.

Apperley, M. et al., "Breaking the Copy/Paste Cycle: The Stretchable Selection Tool", Computer Science Department, New Zealand, Feb. 2000, pp. 1-8.

Rich, Charles and Sidner, Candace L., "Segmented Interaction History in a Collaborative Interface Agent," 1997 ACM, pp. 23-30.

Dwelly, Andrew, "Functions and Dynamic User Interfaces," 1989 ACM, pp. 371-381.

Kurtenbach, Gordon et al., "The Hotbox: Efficient Access to a Large Number of Menu-items," ACM 1999, pp. 231-237.

Rich, Charles and Sidner, Candace L., "Adding a Collaborative Agent to Graphical User Interfaces," 1996 ACM, pp. 21-30.

Boyce, Jim, "Microsoft Outlook Inside Out," 2001, Redmond, Washington, pp. 67, 68, 109, 110, 230, 231, 310, 316-318, 798.
Halvorson, Michael and Young, Michael, "Microsoft Office XP Inside Out," 2001, Redmond, Washington, pp. 1005-1009, 1015, 1023-1028, 1036-1039, 1093.
Riggsby, Matt et al., "Mastering Lotus Notes and Domino 6," 2003, Alameda, California, pp. 135-139.
Riggsby, Matt, et al., "Mastering Lotus Notes and Domino 6," 2003, Alameda, California, pp. 135-138, 607-612.
"Primary Windows," http://www-03.ibm.com/servers/eserver/iseries/navigator/guidelines/primary.html, date unknown (printed Feb. 23, 2007, 23 pages.
Schumaker, Dennis, "User Interface Standards," http://msdn2.microsoftt.com/en-us/library/aa217660(office.11,d=printer).aspx, Sep. 2001, 5 pages.
Budinsky, F. et al., "WebSphere Studio Overview," http://researchweb.watson.ibm.com/journal/sj/432/budinsky.html, May 6, 2004, 25 pages.
Padwick, Gordon, Ebook titled "Special Edition Using Microsoft Outlook 2002", published May 17, 2001, pp. 1-7.
"Evermore Integrated Office is the 'First REAL Office'", Evermore Software Ltd., 2001-2004, retrieved Jan. 24, 2007, http://web.archive.org/web/20040106195344/www.evermoresw.com/weben/product/eio_ . . . , 2 pp.
U.S. Official Action mailed Oct. 24, 2006 in U.S. Appl. No. 10/664,740.
U.S. Official Action mailed Feb. 20, 2007 in U.S. Appl. No. 10/420,621.
U.S. Official Action mailed Apr. 19, 2007 in U.S. Appl. No. 10/397,103.
U.S. Official Action mailed Jul. 13, 2007 in U.S. Appl. No. 10/664,740.
U.S. Official Action mailed Jul. 16, 2007 in U.S. Appl. No. 11/063,309.
Kraynak, Joe, "Absolute Beginner's Guide to Microsoft Office Excel 2003", Que, Sep. 2003, 14 pp.
Baker, Richard, "Microsoft Office 2004 for Mac in a Snap", Sams, Aug. 2004, 17 pp.
U.S. Official Action mailed Nov. 12, 2008 in U.S. Appl. No. 10/955,232.
U.S. Official Action mailed Nov. 17, 2008 in U.S. Appl. No. 11/326,110.
PCT Search Report mailed Jun. 22, 2007 in PCT/US2007/000248.
PCT Search Report mailed Jun. 22, 2007 in PCT/US2007/000244.
Chinese First Office Action mailed Oct. 31, 2008 in 200510088531.1.
U.S. Official Action mailed Dec. 10, 2008 in U.S. Appl. No. 11/326,583.
U.S. Official Action mailed Nov. 5, 2007 in U.S. Appl. No. 10/420,621.
U.S. Official Action mailed Jan. 7, 2008 in U.S. Appl. No. 10/397,103.
U.S. Official Action mailed Jan. 7, 2008 in U.S. Appl. No. 11/063,309.
U.S. Official Action mailed Mar. 10, 2008 in U.S. Appl. No. 10/955,232.
U.S. Official Action mailed May 12, 2008 in U.S. Appl. No. 10/397,103.
U.S. Official Action mailed Feb. 21, 2008 in U.S. Appl. No. 11/326,110.
U.S. Official Action mailed Mar. 5, 2008 in U.S. Appl. No. 11/326,583.
U.S. Official Action mailed Jul. 9, 2008 in U.S. Appl. No. 10/387,287.
Young et al., "Microsoft Office System Inside Out: 2003 Edition", published Sep. 10, 2003, pp. 1-168.
"Setting Reminders in Outlook", California Lutheran University Information Systems and Services, Nov. 2005, 3 pp.
Slovak, Ken, "Absolute Beginner's Guide to Microsoft Office Outlook 2003", Que, Oct. 1, 2003; Chapter 1: Personal Information Management, Chapter 2: Working in Outlook's User Interface, Chapter 4: Flagging E-Mails and E-Mail Reminders, Chapter 7, Chapter 12: Using Advanced Find, 6 pp.
Gnome 2.8 Desktop User Guide, Sun Gnome Documentation Team, 2004, 67 pp.
Braun, Owen, "Owen Braun: OneNote 12: Linking related notes together (really)", Date: Oct. 6, 2005, http://blogs.msdn.com/owen_braun/archive/2005/10/06/477615.aspx, 6 pp.
Braun, Owen, "Owen Braun: OneNote 12: Linking related notes together", Date: Oct. 6, 2005, http://blogs.msdn.com/owen_braun/archive/2005/10/06/477610.aspx, 2 pp.
Braun, Owen, "Owen Braun: OneNote 12: New Extensibility in OneNote 12", Date: Oct. 6, 2005, http://blogs.msdn.com/owen_braun/archive/2005/12/15/503879.aspx, 2 pp.
"SOHO Notes Tour: Note-Taking", http://www.chronosnet.com/Products/sohonotes/sn_notetaking.html, Date Unknown, 3 pp.
Henzinger, Monica, "Link Analysis in Web Information Retrieval", Date: 2000, http://www.acm.org/sigs/sigmod/disc/disc01/out/websites/deb_september/henzinge.pdf, 6 pp.
"Accessibility Essentials 2 Authoring Accessible Documents—Inserting Hyperlinks: Linking internally within a document", http://www.techdis.ac.uk/resources/sites/accessibilityessentials2/modules/authoring%20accessible%20docs/hyperlink%20internally.html, Date Unknown, 4 pp.
"Tomboy: Simple Note Taking", Date: 2004-2006, http://www.beathiksoftware.com/tomboy/, 4 pp.
U.S. Official Action mailed Mar. 13, 2009 in U.S. Appl. No. 10/955,232.
U.S. Official Action mailed May 20, 2009 in U.S. Appl. No. 11/599,598.
U.S. Official Action mailed Jun. 11, 2009 in U.S. Appl. No. 11/599,626.
European Search Report mailed Jan. 30, 2009 in 07717882.0-1527/1977340.
European Search Report mailed Jan. 30, 2009 in 07717837.4-1527/1977339.
European Examination Report mailed Mar. 25, 2009 in 07717882.0-1527/1977340.
European Examination Report mailed Apr. 1, 2009 in 07717837.4-1527/1977339.
"Microsoft Office 2003 Editions Product Guide", Internet Publication, Sep. 2003, 168 pp.
U.S. Official Action mailed Jun. 18, 2007 in U.S. Appl. No. 10/954,954.
U.S. Official Action mailed Mar. 18, 2008 in U.S. Appl. No. 10/954,954.
U.S. Official Action mailed Oct. 28, 2008 in U.S. Appl. No. 10/954,954.
U.S. Official Action mailed Dec. 11, 2008 in U.S. Appl. No. 11/405,251.
U.S. Official Action mailed May 21, 2009 in U.S. Appl. No. 11/326,583.
U.S. Official Action mailed Jun. 11, 2009 in U.S. Appl. No. 11/405,256.
U.S. Official Action mailed Jun. 15, 2009 in U.S. Appl. No. 10/420,621.
U.S. Official Action mailed Jul. 17, 2009 in U.S. Appl. No. 11/405,251.
U.S. Official Action mailed Aug. 7, 2009 in U.S. Appl. No. 11/326,110.
PCT Search Report dated Aug. 27, 2007 in PCT/US2007/007233.
PCT Search Report dated Sep. 21, 2007 in PCT/US2007/007231.
Mexican Official Action dated Feb. 20, 2009 in PA/a/2005/007147—English Translation Only.
Russian Office Action dated Jun. 15, 2009 in 2005120371—no English translation yet.
Chinese Second Office Action dated Jul. 10, 2009 in 200510088531.1.
European Examination dated Oct. 10, 2009 in 07717882.0-1527.
European Examination dated Oct. 10, 2009 in 07717837.4-1527.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.

"What's Hot in Internet Services?" http://www.webreference.com/html/tutorial5/3, Aug. 20, 1998, 3 pgs.

"The Style Element & CSS Selectors," http://www.webreference.com/html/tutorial5/4.html, Aug. 20, 1998, 3 pgs.

"The Style Element & CSS Selectors", http://www.webreference.com/html/tutorial5/5.html, Aug. 20, 1998, 3 pgs.

"ID & Class Selectors, Pseudoclasses," http://www.webreference.com/html/tutorial5/6.html, Aug. 20, 1998, 3 pgs.

"ID & Class Selectors, Pseudoclasses", http://www.webreference.com/html/tutorial5/7.html, Aug. 20, 1998, 3 pgs.

"ID & Class Selectors, Pseudoclasses", http://www.webreference.com/html/tutorial5/8.html, Aug. 20, 1998, 2 pgs.

"External Style Sheets," http://www.webreference.com/html/tutorial5/10.html, Aug. 20, 1998, 3 pgs.

Raman, "Cascaded Speech Style Sheets," 1997, 7 pgs.

Hopkins, "The Design and Implementation of Pie Menu", Originally published in Dr. Dobb's Journal, 1991, pp. 1-7.

Lewis, "Easy Microsoft Office 2003", Sep. 2003, 10 pp.

Microsoft Press, "Microsoft Windows User Experience", 1999, pp. 51-52.

Long, Jr., et al., "A Prototype User Interface For A Mobile Multimedia Terminal," Department of Electrical Engineering and Computer Sciences, The University of California at Berkeley, Berkeley, CA. http://sigchi.org/chi95/Electronic/documents/intex;/acl_bdy.htm, retrieved Jan. 10, 2006, 4 pp.

Landay, et al., "NotePals: Sharing and Synchronizing Handwritten Notes with Multimedia Documents," EECS Department, University of California, Berkeley, CA http://www.cs.berkeley.edu/~landay/research/publications/hcscw/HCSCW-NotePals.html, retrieved Jan. 10, 2006, 8 pp.

Singh, et al., "Collaborative Note Taking Using PDAs" Department of Computer Science, Naval Postgraduate School, Monterey, CA—http://www.fxpal.com/people/denoue/publications/jise_2005.pdf, 2005, pp. 835-848.

Weverka, Microsoft Office OneNote 2003, Step by Step, http://proquest.safaribooksonline.com/0735621098, Microsoft Press, Jul. 13, 2004, pp. 1-64.

Harter, et al., A Distributed Location System for the Active Office, IEEE Network, 1994, pp. 62-70.

Chen, et al., A Survey of Context-Aware Mobile Computing Research, Dartmouth Computer Science Technical Report, 2000, 16 pages.

Schilit, A System Architecture for Context-Aware Mobile Computing, Columbia University, 1995, 153 pages.

Spreitzer, et al., Providing Location Information in a Ubiquitous Computing Environment, SIGOPS '93, 1993, pp. 270-283.

Theimer, et al., Operating System Issues for PDAs, In Fourth Workshop on Workstation Operating Systems, 1993, 7 pages.

Want, Active Badges and Personal Interactive Computing Objects, IEEE Transactions on Consumer Electronics, 1992, 11 pages, vol. 38—No. 1.

Schilit, et al., The ParcTab Mobile Computing System, IEEE WWOS-IV, 1993, 4 pages.

Schilit, et al., Context-Aware Computing Applications, In Proceedings of the Workshop on Mobile Computing Systems and Applications, Dec. 1994. pp. 85-90.

Schilit, et al., Customizing Mobile Applications, Proceedings USENIX Symposium on Mobile and Location Independent Computing, Aug. 1993, 9 pages.

Spreitzer, et al., Architectural Considerations for Scalable, Secure, Mobile Computing with Location Information, In the 14th International Conference on Distributed Computing Systems, Jun. 1994, pp. 29-38.

Spreitzer et al., Scalable, Secure, Mobile Computing with Location Information, Communications of the ACM, Jul. 1993, 1 page, vol. 36—No. 7.

Want, et al., The Active Badge Location System, ACM Transactions on Information Systems, Jan. 1992, pp. 91-102, vol. 10—No. 1.

Weiser, Some Computer Science Issues in Ubiquitous Computing, Communications of the ACM, Jul. 1993, pp. 75-84, vol. 36—No. 7.

Billinghurst, et al., An Evaluation of Wearable Information Spaces, Proceedings of the Virtual Reality Annual International Symposium, 1998, 8 pages.

Rhodes, Remembrance Agent: A continuously running automated information retrieval system, The Proceedings of The First International Conference on The Practical Application Of Intelligent Agents and Multi Agent Technology, 1996, pp. 487-495.

Horvitz, et al., In Pursuit of Effective Handsfree Decision Support: Coupling Bayesian Inference, Speech Understanding, and User Models, 1995, 8 pages.

Rhodes, The Wearable Remembrance Agent: A System for Augmented Theory, The Proceedings of the First International Symposium on Wearable Computers, Oct. 1997, pp. 123-128.

Horvitz, et al., Attention-Sensitive Alerting in Computing Systems, Microsoft Research, Aug. 1999.

Schilit, et al., Disseminationg Active Map Information to Mobile Hosts, IEEE Network, 1994, pp. 22-32, vol. 8—No. 5.

Billinghurst, et al., Wearable Devices: New Ways to Manage Information, IEEE Computer Society, Jan. 1999, pp. 57-64.

Starner, Wearable Computing and Contextual Awareness, Massachusetts Institute of Technology, Jun. 1999, 248 pages.

Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Billinghurst, Research Directions in Wearable Computing, University of Washington, May 1998, 48 pages.

Weiser, The Computer for the 21st Century, Scientific American, Sep. 1991, 8 pages.

Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Losee, Jr., Minimizing information overload: the ranking of electronic messages, Journal of Information Science 15, Elsevier Science Publishers B.V., 1989, pp. 179-189.

U.S. Official Action mailed Jun. 13, 2006 in U.S. Appl. No. 10/420,621.

U.S. Official Action mailed Oct. 14, 2009 in U.S. Appl. No. 10/955,232.

U.S. Official Action mailed Oct. 19, 2009 in U.S. Appl. No. 11/599,598.

U.S. Official Action mailed Dec. 23, 2009 in U.S. Appl. No. 11/405,251.

Chinese First Office Action dated Oct. 30, 2009 in 200780001988.1.

Chinese First Office Action dated Dec. 18, 2009 in 200780001911.4.

U.S. Official Action mailed Feb. 4, 2010 in U.S. Appl. No. 11/405,256.

Mexican Official Action dated Oct. 26, 2009 in PA/a/2005/007147.

Boyce, "Microsoft Outlook Version 2002 Inside Out". 2001, Redmond, Washington, p. 14.

* cited by examiner

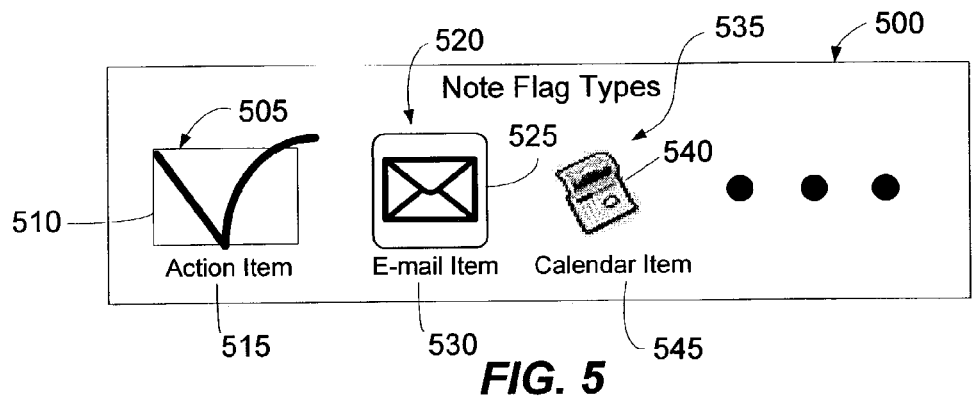
FIG. 5
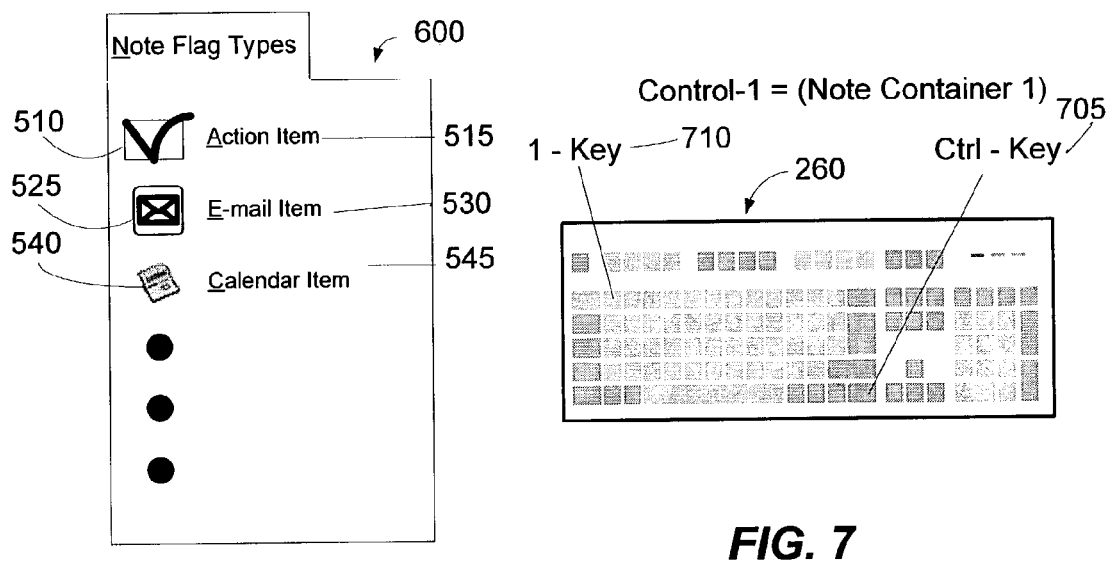
FIG. 6
FIG. 7
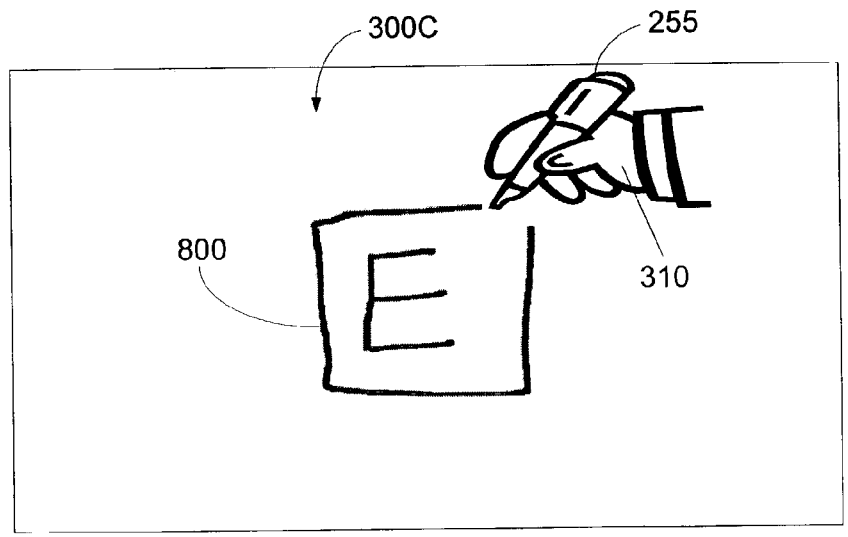
FIG. 8

SYSTEM AND METHOD FOR CUSTOMIZING NOTE FLAGS

TECHNICAL FIELD

The present invention relates to creating notes in electronic documents through typewritten text or handwritten text, and more specifically, it relates to marking notes with note flags and customizing these note flags so that some notes in a group of notes are visually distinguishable from the group.

BACKGROUND OF THE INVENTION

One of the simplest methods of recording and communicating information is the traditional method of writing the information down on a piece of paper with a writing instrument such as a pen. Writing information by hand on a piece of paper is inexpensive and can be done quickly and easily with little preparation. The traditional method is also flexible in that a writer can generally write in any format anywhere on the page. One of the limitations with handwritten work is that it is not easily manipulated or transferred to other contexts. In other words, changing or transferring a piece of handwritten text typically requires rewriting the text on another medium.

Handwritten notes are often rewritten with personal computers. Specifically, with the widespread use of personal computers, textual information often is recorded using word processing software running on a personal computer. The advantage of such electronic methods for recording information is that the information can be easily stored and transferred to other remote computing devices and electronic media. Such electronically recorded text can also be easily corrected, modified, and manipulated in a variety of different ways.

Typical computer systems, especially computer systems using graphical user interface (GUI) systems such as Microsoft WINDOWS, are optimized for accepting user input from one or more discrete input devices. Common input devices include a keyboard for entering text and a pointing device, such as a mouse with one or more buttons, for controlling the user interface. The keyboard and mouse interface facilitates creation and modification of electronic documents including text, spreadsheets, database fields, drawings, and photos.

One of the limitations with conventional GUI systems of computers is that a user must generally type the text they are entering into the personal computer using the keyboard. Entering text using a keyboard is generally slower and more cumbersome than handwriting. Although recent advances have been made in reducing the size of personal computers, they are still not as portable and easily accessible as traditional paper and pen. Furthermore, traditional pen and paper provide the user with considerable flexibility for editing a document, recording notes in the margin, and drawing figures and shapes. In some instances, a user may prefer to use a pen to mark-up a document rather than review the document on-screen because of the ability to freely make notes outside of the confines of the keyboard and mouse interface.

To address the shortcomings of traditional keyboard and mouse interfaces, there have been various attempts to create an electronic tablet that can record handwriting. Such electronic tablets typically comprise a screen and a handheld device that is similar to a pen (also referred to as a stylus). A user can manipulate the pen to write on the electronic tablet in a manner similar to the use of traditional pen and paper. The electronic tablet can "read" the strokes of the user's handwriting with the handheld device and render the handwriting in electronic form on the tablet's screen and/or the computer's display as "electronic ink". This electronic tablet approach can be employed in a variety of ways including, on a personal computer and on a handheld computing device.

While the electronic tablet approach has overcome many of the shortcomings of traditional keyboard and mouse interfaces, the electronic tablet approach has not overcome some of the problems often associated with conventional handwritten techniques that employ pen and paper. For example, when notes are taken during a meeting by a user, the information contained in the notes may not be organized in a manner desired by the user. And the user may not have time during the meeting and during presentation of information to move or position notes being taken according to a user's desired organization. Further, an electronic tablet approach as well as traditional keyboard and mouse approaches also suffer from the problem of being able to visually distinguishing a first set of notes from a second set of notes that may be presented on a display device.

Specifically, while information is being recorded in the notes by a user, some notes of a set of notes may have various degrees of importance. Further, some notes of a set may require follow up actions by the user while the remaining notes are only taken to preserve information that is presented to a user.

With conventional pen and paper approaches, a user will typically develop his or her own personalized system for distinguishing certain types of notes from other types of notes. For example, a user may flag a note that requires further action of the user after the act of taking the note with a special character or symbol or graphical technique in order to make certain that a particular note "stands out" from other notes on a page of notes. Conventional electronic ink tablets and conventional keyboard and mouse approaches do not have a way to visually distinguish a first set of notes from a second set of notes presented on a display device.

The closest conventional technology for visually distinguishing data from other data may include tasks that are part of conventional appointments/task/e-mail management software such as the product Microsoft Outlook (the assignee of the present application). Tasks as well as e-mails in the Microsoft Outlook product can include flags that comprise icons in order to visually separate tasks from other tasks or e-mails from other e-mails. Specifically, for tasks, a check box icon can be marked with an "X" to designate that the task is complete. Alternatively, the check box icon can remain empty to indicate that the task associated with this check box icon is incomplete.

Similarly, e-mails can be associated with one or more predetermined and fixed icons that designate a particular status. For example, an e-mail may be associated with a "flag" icon to indicate to a user that follow up action is required for a particular e-mail. Also, an e-mail may be associated with an exclamation point character to indicate that a particular e-mail has a higher importance relative to other e-mails which may not have an exclamation point.

While tasks and e-mails of the Microsoft Outlook product may include these predetermined and fixed flags to visually distinguish a first set of data from another set of data, e-mails and tasks are usually presented in user interfaces that are separate from one another. That is, if a user is creating a task, then only task data can be displayed to the user. Similarly, if an e-mail is being created, only e-mails can be presented to the user. The conventional technology does not provide a way to present tasks and e-mails on the same page. Also, the conventional technology does not provide a way visually distinguish a first set of notes comprising various different categories of items from a second set of notes that may comprise various different sets of items.

Further, the conventional technology does not permit a user to customize or change the look or "feel" of flags that may be associated with a particular task or an e-mail. With the conventional technology, a user is forced to conform his or her notes to the predefined format of the flags such as the "flags" for following up e-mails and check boxes for task items.

In addition to the lack of customization for flags associated with notes, conventional technology does not link notes taken by a user with corresponding application program that may be needed to perform one or more notes taken by the user. For example, a user may create a note that reminds him or her to e-mail another person as a result of a meeting. After creating such a note, a user later opens up an e-mail application program in order to prepare the e-mail for the person identified in the note. If the user records several notes that pertain to different applications, then the user will need to open up as many corresponding separate application programs relative to the note recording application program.

Accordingly, there is a need in the art for a method and system for customizing note flags such that a user can customize the look or "feel" of a note flag. There is also a need in the art for a method and system that allows customization of note flags by providing a user with several options in order to create note flags that are visually distinguishable from one another. A further need exists in the art for a method and system that can link a note flag with a particular action of another application program. In other words, there is a need in the art for a note flag that can initiate an operation in another application program when the particular note flag is selected by a user.

SUMMARY OF THE INVENTION

The present invention can comprise a method and system for customizing note flags. Note flags can include various ways to visually distinguish a first set of notes from a second set of notes presented on a display device. Meanwhile, notes can include type written characters, electronic ink, or any other types of characters that can be presented on a display device.

Exemplary note flags can include, but are not limited to, label names for a graphical icon, the shape or type of a graphical icon, a highlight color for the characters of a note, and a font color for one or more characters of a note. Note flags can visually set apart or identify a first set of notes from a second set of notes such that the first set of notes can have a unique or special meaning relative to other sets of notes that may be present on a particular page of notes on a display device.

For example, when notes are taken during a meeting by a user, the information contained in the notes may not be organized in a manner desired by the user. And the user may not have time during the meeting to move or position the notes according to his or her desired organization. With the present invention, a user can categorize information contained in notes as the notes are generated. Specifically, the user can use note flags as a way to categorize notes as they are created. Alternatively, after notes are created, a user can review existing notes and select notes to be flagged according to the features of the present invention.

With the present invention, a user can select from several different types of note flags. According to one exemplary embodiment, a user can select from nine different types of note flags. However, the present invention is not limited to this number of note flag types. A fewer or greater number of note flag types can be employed without departing from the scope and spirit of the present invention.

For each note flag type, a user can customize the look or "feel" of a note flag. Specifically, a user can assign a label name for a graphical icon associated with a note flag. A user can also select the highlight color as well as the font color for a particular note flag. And a user can also select and change a graphical icon associated with a particular note flag.

By customizing a note flag, a user can assign a particular meaning for each type of note flag. For example, a user could assign a first note flag type to indicate an action item to be completed by the user. The user could assign a second note flag type to indicate a calendar item that should be recorded on a personal calendar. For the first note flag, a user could select an icon comprising a square box that can be "checked" at a later time to indicate the action item has been completed. For the second note flag, a calendar icon can be assigned such that the user will recognize that any text or into adjacent to this "flag" should be recorded on a calendar.

In this way, as information is being recorded or created, a user can categorize his notes. Alternatively, after a user creates some notes, he can return to the existing notes and assign a particular note flag to them.

According to one exemplary embodiment, a user can customize a note flag by selecting options from a list or table of options. Specifically, a user can select the icon, highlight color, and font color associated with a particular note flag from a drop down menu that lists all available options for each of these note flag features. After selecting an option from a drop down menu, a preview of the selected option can be displayed prior to saving the option for a particular note flag.

A note flag can be activated by striking a predetermined key board combination. Alternatively, a note flag can be activated by selecting a command from a drop down menu. A note flag can also be activated by striking a button of a tool bar that services only note flags. And as another alternative, a note flag could be activated by recognizing an electronic ink gesture or a combination of letters associated with a particular note flag.

According to another aspect of the invention, a note flag can be linked with a particular action that can occur within the program supporting notes and the note flags or the note flag can be linked with action associated with another application, outside the application program supporting the notes and not flags. In other words, when a note flag is activated, it can initiate an operation within the current document supporting the notes or the note flag upon activation can initiate action in another application program.

For example, a user could associate a note flag with an action of taking a note and displaying it in a special window adjacent to a window that is currently receiving note data. As other non-limiting example, a user could associate a note flag with an e-mail operation that occurs in an application program outside of the application program supporting notes and note flags. When a particular note is "flagged" with this e-mail note flag, a new e-mail message could be generated where the note can be copied into the new e-mail message. The user could add more information to the e-mail message, select the recipients intended to receive the note, and then send the e-mail to the recipients.

As another non-limiting example of a note flag linked to an application program outside of the application program supporting note flags and notes, a user could associate a note flag with a calendar operation. When a particular note is marked with this calendar note flag, a new appointment could be generated in a calendar program where the note is copied into the subject of the new appointment. Date information could be automatically extracted from the note such that the new appointment reflects this extracted date information. The user could then identify the location of the appointment and other information as needed to complete the appointment before it is saved in the calendar program.

The aforementioned discussion of an e-mail item and calendar item are for illustrative purposes only. The present invention can link note flags to any type of action or functionality of another application program relative to the document editing program that can capture either electronic ink or typed text or both.

BRIEF DESCRIPTION OF THE DRAWINGS

FIG. 5 illustrates an exemplary tool bar that lists different types of note flags that can be selected according to one exemplary embodiment of the present invention.

FIG. 6 is an exemplary drop down menu that lists different types of note flags that can be selected according to another exemplary embodiment of the present invention.

FIG. 7 illustrates a keyboard and a combination of keys that can be selected to activate a particular note flag according to one exemplary embodiment of the present invention.

FIG. 8 illustrates an exemplary display screen in which a handwritten gesture has been created in order to activate a particular note flag type according to one exemplary embodiment of the present invention.

DETAILED DESCRIPTION OF EXEMPLARY EMBODIMENTS

A method and system for customizing note flags allows a user to change the look or "feel" of a note flag. A user can be provided with several options in order to create note flags that are visually distinguishable from one another. In this way, the note flags can be used to visually distinguish a first note or first set of notes from a second note or a second set of notes. The method and system can also link note flags with a particular action in an application program supporting the notes or the method and system could link note flags with action of another application program relative to a document editing module. In other words, when a note flag is activated, it can initiate an operation within the current document supporting the notes or the note flag upon activation can initiate action in another application program.

Exemplary Operating Environment

Figure 1:
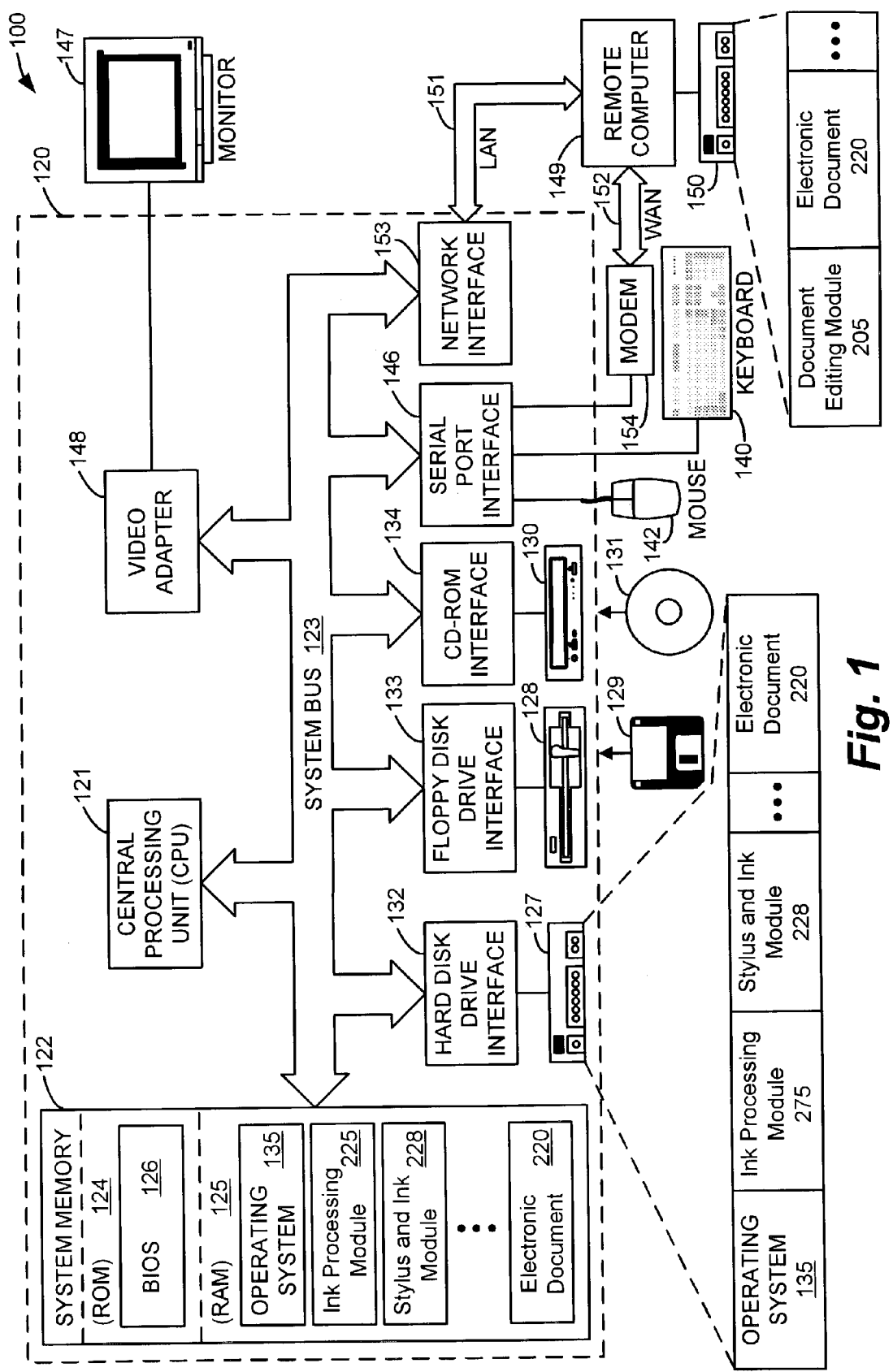
FIG. 1 is a block diagram illustrating an exemplary operating environment for implementing various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention.

The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively.

Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, an ink processing module 225, a stylus and ink module 228, and an electronic document 220. Program modules include routines, sub-routines, programs, objects, components, data structures, etc., which perform particular tasks or implement particular abstract data types. Aspects of the present invention may be implemented in the form of a ink processing module 225 that can operate in concert with a stylus and ink module 228 to edit an electronic document 220.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
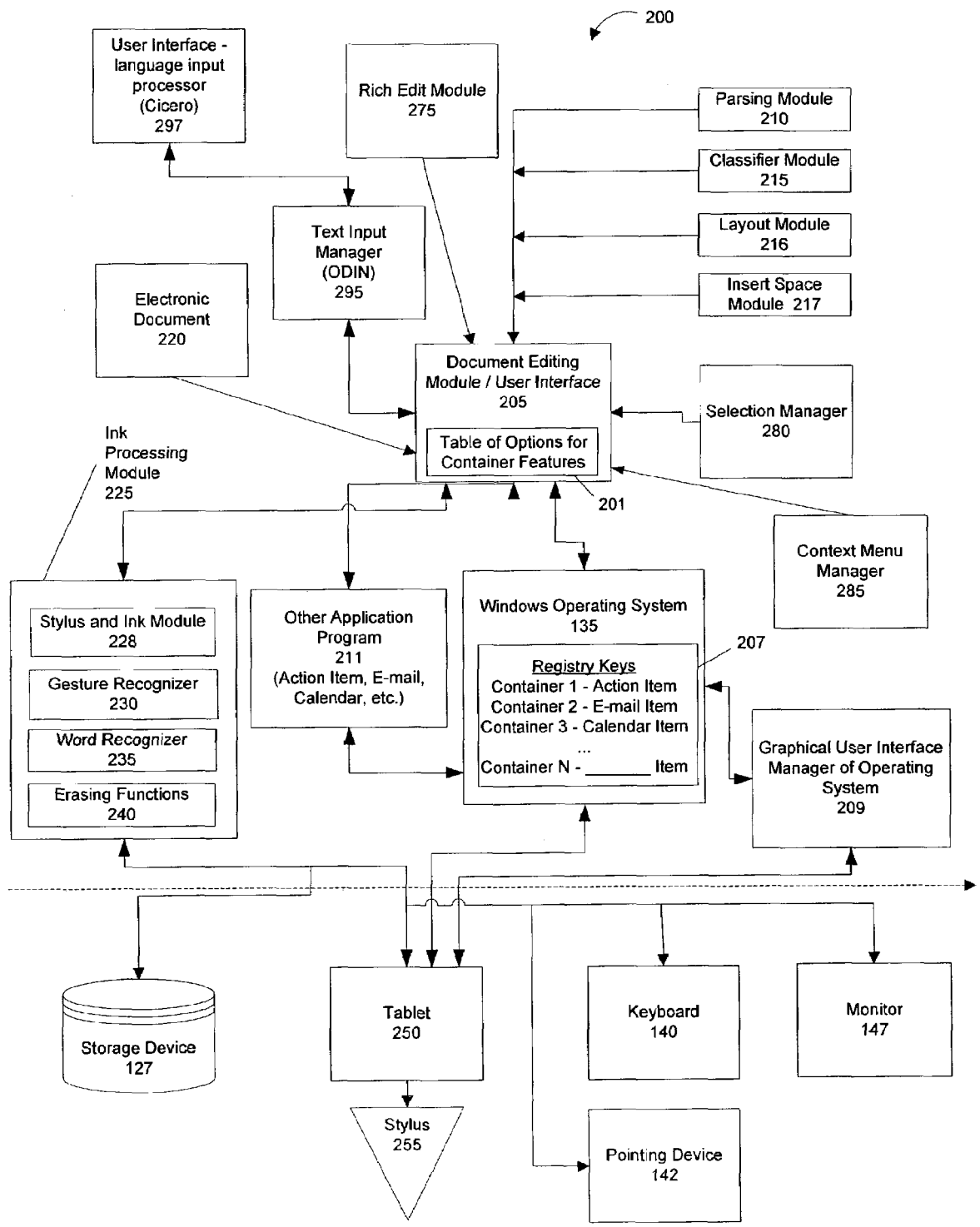
FIG. 2 is a block diagram depicting primary functional components of an exemplary free-form document editor and related input devices used to create notes.

Referring to FIG. 2, an exemplary architecture 200 is illustrated for editing electronic ink in accordance with an embodiment of the present invention. FIG. 2 shows typical hardware and software components used in operating the invention from a functional perspective. Conventional input devices are represented by the keyboard 260 and the pointing device (mouse) 265. A user can enter commands and information into the computer 120 using the input devices. Other input devices (not shown) may include a microphone, joystick, game pad, satellite dish, and scanner.

A conventional output device, such as monitor 270, is used to display information from the computer 120. Other output devices (not shown) can include a printer or speaker. Other hardware components shown in FIG. 2 include an electronic tablet 250 and an accompanying stylus 255. The tablet 250 and stylus 255 are used to input handwriting strokes which are converted to collections of data that can be represented as electronic ink. The electronic ink may be incorporated into an electronic document 220 and may be displayed on either the electronic tablet 250, the monitor 270, or both.

Although the electronic tablet 250 and the monitor 270 are illustrated as being distinct, in the preferred embodiment they are either coupled or form a single component. The joint tablet/monitor component has the ability to display information and receive input from the stylus 255. Also shown among the hardware components is a conventional electronic storage device such as a hard drive 127 or RAM 125.

In the representative architecture 200, all of the hardware components are coupled to an ink processing software module 225. It should be understood by those skilled in the art that FIG. 2 is merely representative and that in practice the hardware components typically are coupled to the elements shown in FIG. 1. The ink processing module 225 is operable for receiving data from the electronic tablet 250 and/or the stylus 255 and rendering that data as electronic ink. In the preferred and exemplary embodiment, the ink processing module 225 is a collection of software modules that perform different tasks for rendering handwriting strokes as electronic ink.

For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink processing module 225 can also include an erasing functions module 240 for removing electronic ink that has been previously rendered.

Although ink processing modules are known in the art and necessary for an electronic tablet to function, what is needed is a document editing module 205, such as the one shown in FIG. 2, that enhances the performance of an electronic tablet. Specifically, document editing module 205 facilitates the manipulation of electronic ink so that a user can create and manipulate an electronic document 220 with greater ease and sophistication. The document editing module 205 can comprise a table of options 201 for container features. A container can refer to a body of data that comprises the formatting for a particular note flag.

When the document editing module 205 needs to determine the current properties for a particular container comprising the formatting of a particular note flag, the document editing module 205 accesses the registry keys 207 of the windows operating system 135. The registry keys 207 contain the current properties of a particular note flag. The properties of note flags will be discussed in further detail below. The windows operating system 135 can comprise a graphical user interface (GUI) manager 209. The GUI manager 209 in combination with the document editing module 205 comprising the options table 211 can generate the note flag customization GUI 1400 as will be discussed in further detail below.

The document editing module 205 can also be operatively linked to other application programs 211, such as action item programs, e-mail programs, calendar programs and the like. The document editing module can use application programming interfaces (APIs) (not shown) to form this link. With the APIs, the document editing module 205 can make calls to other application programs in response to the "activation" of a note flag as will be discussed in further detail below with respect to one aspect of the present invention.

The document editing module 205 may further comprise a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing. Software modules such as the layout module 216 and the insert space module 217 can be designed to control how electronic ink is rendered and moved. Other modules can include a selection manager 280, a context menu manager 285, a text input manager 295, and a user interface language input processor 297.

The selection manager 280 can monitor how converted text or electronic ink is selected for editing by the user. The context menu manager 285 can monitor the selection of a list of alternate words that can be displayed when a user edits a word in converted text. The text input manager 295 can operate as an interface for a user interface language input processor 297 that uses language rules to assist in the recognition of words through context.

The modules shown in FIG. 2 are representative and those skilled in the art should understand that other modules may also be part of or coupled to the document editing module 205. For example, the document editing module 205 may also work with a rich edit module 275 that provides added functionality such as monitoring and controlling the selection of text and word wrapping.

The present invention includes multiple computer programs which embodies the functions described herein and illustrated in the exemplary display screens and the appended flow chart. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary display screens and flow charts and associated description in the application text, for example.

Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

Exemplary Display Screens in Graphical User Interfaces

Figure 3:
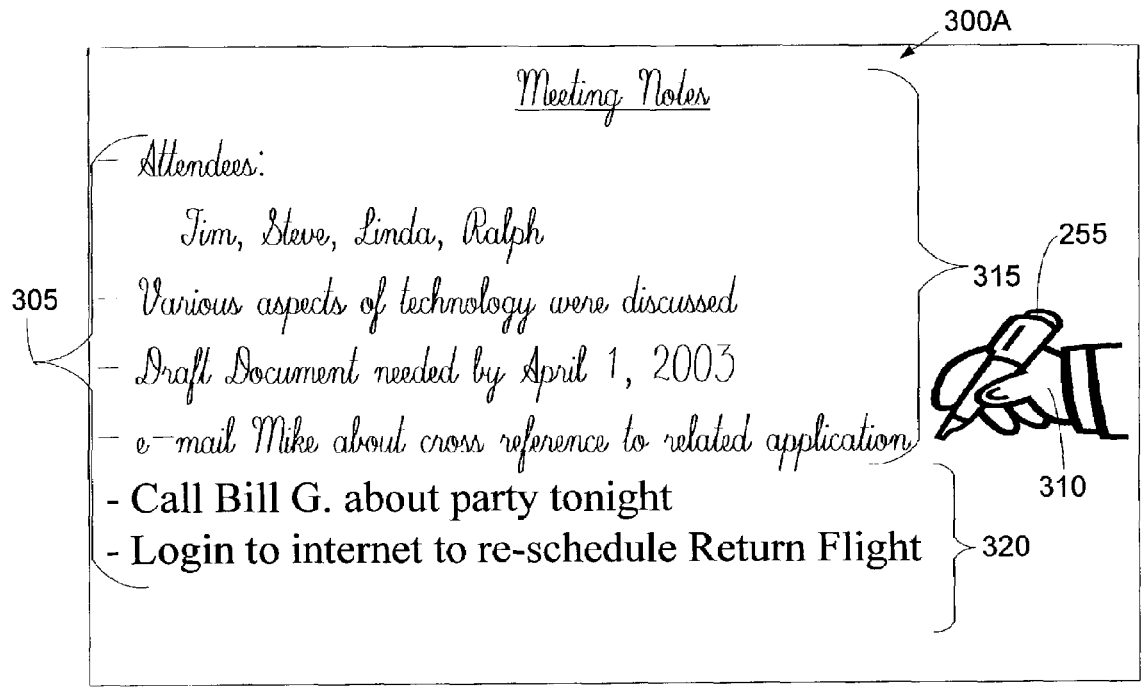
FIG. 3 is an exemplary display screen that illustrates different types of notes that can be created with a stylus and hand movements as well as typewritten text generated with a keyboard.

Referring now to FIG. 3, this figure illustrates exemplary display screen 300 that comprises different types of notes 305 taken by a user during a meeting. A user can generate the different notes 305 with a stylus 255 and his or her hand 310 or with a keyboard 260 and a pointing device 265 such as mouse 142 or the like. Within the larger group of different types of notes 305 exist a first set of notes 315 and a second set of notes 320. The first set of notes can be generated with the stylus 255 and may comprise electronic ink while the second set of notes 320 can comprise typewritten text that are created with a keyboard 260.

While the large set of various notes 305 pertain to a meeting as illustrated by display screen 300, those skilled in the art will appreciate that other types of notes for recording information pertaining to activities or other purposes are not beyond the scope and spirit of the present invention. That is, the present invention can be used for an infinite number of purposes beyond that of recording information pertaining to a meeting.

Figure 4:
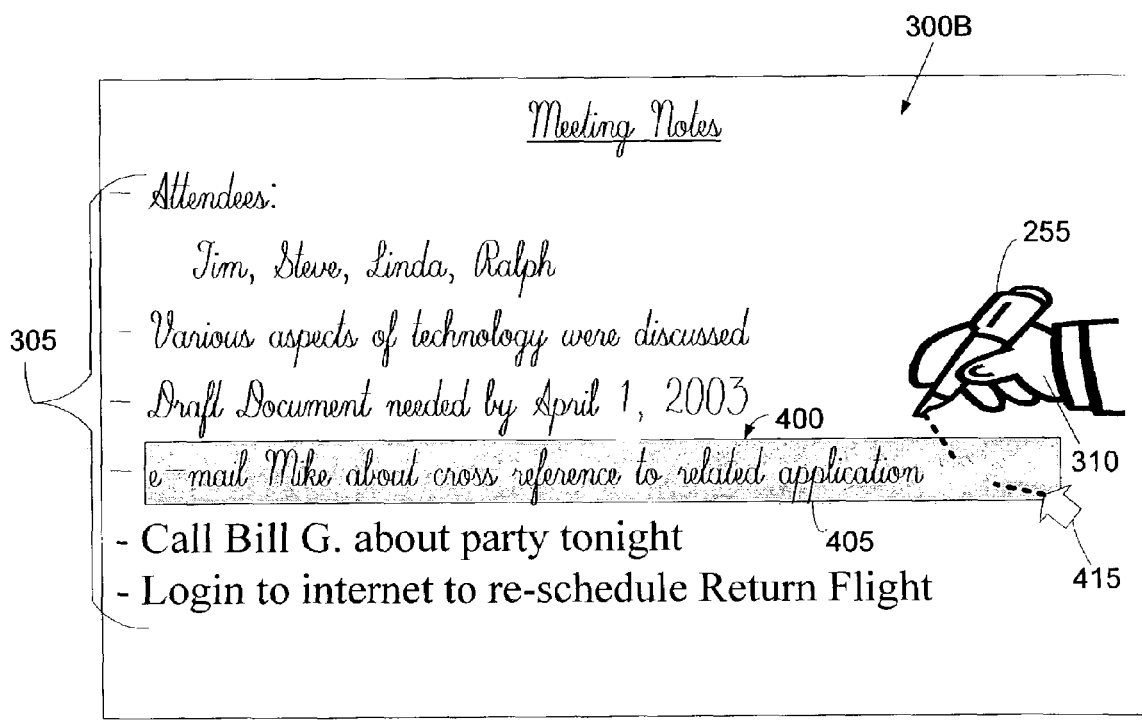
FIG. 4 is an exemplary display screen that illustrates a note being selected from a set of notes according to one exemplary embodiment of the present invention.

Referring now to FIG. 4, this figure illustrates a display screen 300B where a note 400 concerning an e-mail action is selected by a user. The user can select the e-mail note 400 by pointing to it with the stylus 255 or by selecting the e-mail note 400 with a mouse pointer 415. Once the note 400 is selected by the user, a highlight bar 405 envelopes or surrounds the e-mail note 400 in order to inform the user that this note has been selected and is ready for further processing by the document editing module 205.

Once the e-mail note 400 is selected, a user can then select an appropriate note flag to visually distinguish the selected e-mail note 400 from the remaining notes 305 on the display screen 300B. According to the present invention, an appropriate note flag can be selected according to a variety of methods.

Referring now to FIG. 5, this figure illustrates a tool bar 500 that lists different types of note flags that can be selected by a user. Each note flag type can comprise an icon and corresponding text. However, those skilled in the art will recognize that the tool bar 500 can comprise either icons alone or text descriptions of note flag types alone.

For the exemplary embodiment illustrated in FIG. 5, three different note flag types 500 have been illustrated. A first note flag type comprises an action item 505 that can include a first icon 510 and a first text description 515. The first icon 510 can comprise a box with a check mark so that a user can form a type of check list with this particular type of note flag.

A second note flag type can comprise an e-mail item 520 that can include a second icon 525 and a second text description 530. The second icon 525 can comprise a graphic that illustrates an envelope so that a user can associate mail with this particular icon. The second text description can comprise the text "e-mail item."

The third note flag type can comprise a calendar item 535 that can include a third icon 540 and a third text description 545. The third icon 540 can comprise a graphic that represents a calendar while the third text description 545 can comprise the text "calendar item." Those skilled in the art recognize that a fewer number or a greater number of note flag types can be employed without departing from the scope and spirit of the present invention. As will be discussed below, the user can customize or change the icon and corresponding textual description of a note flag as well as the highlight color of the characters of a note, as well as the font color of one or more characters of a note that can be flagged with a particular note flag.

The tool bar 500 can be displayed simultaneously within an open electronic document on a display screen 300 which is supported by the document editing module 205. When a user wants to "flag" a particular note, a user can select the note flag type from the tool bar 500.

Alternatively, referring now to FIG. 6, this figure illustrates a drop down menu 600 that lists different types of note flags similar to the note flag types illustrated in FIG. 5. In addition to or as an alternative to a tool bar 500 of FIG. 5, a user can select note flags from the drop down menu 600 where the drop down menu 600 is part of a tool bar of the document editing module 205.

In addition to or alternative to FIG. 5 and FIG. 6, and referring now to FIG. 7, a combination of keys on a keyboard 260 can activate a particular note flag. For example, as illustrated, a control key 705 can be depressed simultaneously with a number one key 710 in order to activate a first type of note flag. The exemplary key combination of "control-one" can be assigned to a first note flag such as the action item note flag 505 illustrated in FIGS. 5 and 6. Similarly, other note flag types can be assigned different key combinations such as the "control-two" combination to activate a second note flag type.

According to one exemplary embodiment, a user can select from nine different types of note flags that can be assigned to nine different key combinations. However, the present invention is not limited to this number of note flag types. A fewer or greater number of note flag types can be employed without departing from the scope and spirit of the present invention. In addition to or in alternative to FIG. 5 through FIG. 7 discussed above, and referring now to FIG. 8, a user can activate a particular note flag by creating a gesture that is recognizable by an ink processing module 225 in order to activate a particular note flag type.

The exemplary embodiment illustrated in FIG. 8, the gesture 800 can be associated with the e-mail note flag 520 where the gesture 800 can comprise the letter "E" that is surrounded or circumscribed by a substantially square shaped box. When the user generates gesture 800 on the display screen 300C of the document editing module 205, the ink processing module 225 can associate this gesture 800 with a corresponding note flag such as the e-mail note flag 520 illustrated in FIGS. 5 and 6. Those skilled in the art will appreciate that various and numerous types of gestures can be created and assigned by a user for each particular note flag type. According to one exemplary embodiment, a user can assign individual gestures 800 to correspond with respective note flag types that also can be customized or created by the user.

Figure 9:
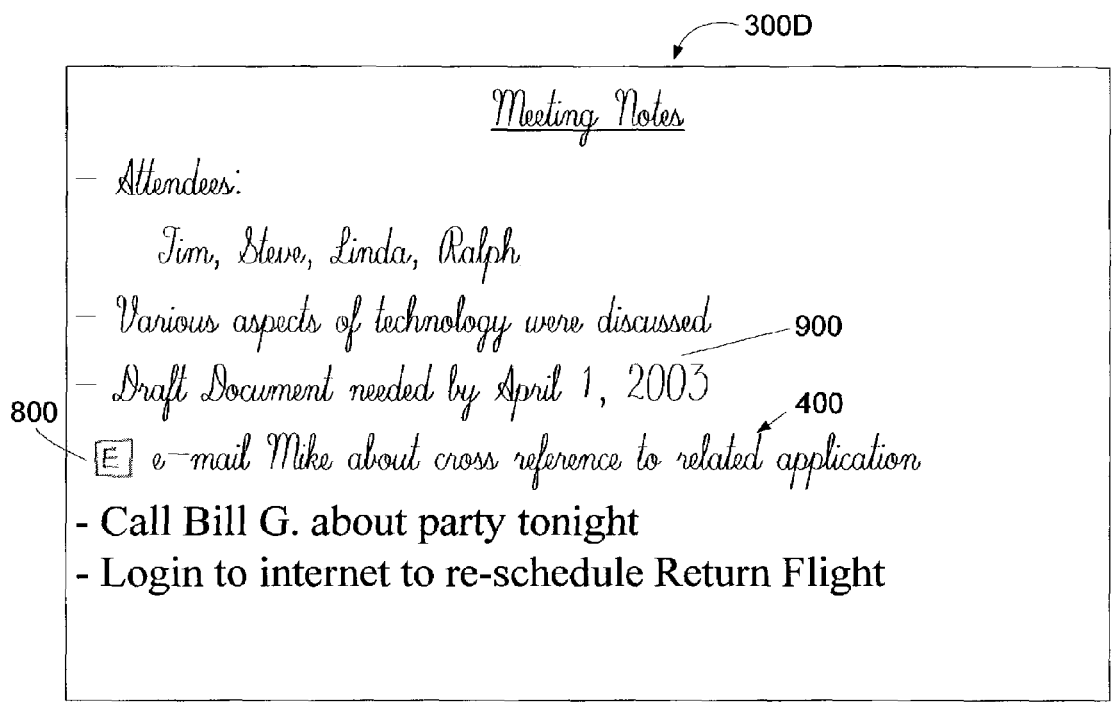
FIG. 9 is an exemplary display screen that illustrates placement of a handwritten gesture to activate a particular note flag for a particular note desired by a user according to another exemplary embodiment of the present invention.

Referring now to FIG. 9, an exemplary display screen 300D is illustrated that shows a gesture 800 created by a user for a selected e-mail note 400. As noted above, a user can select notes and assign note flags to the notes after all the notes have been created or alternatively the user can "flag" notes as they are being created by a user. Therefore, for the example illustrated in FIG. 9, after the "draft document" note 900 is created, a user could then generate gesture 800 on the next line underneath the note 900 to indicate that the note data following the gesture 800 will be assigned this particular note flag that is activated by the gesture 800.

Figure 10:
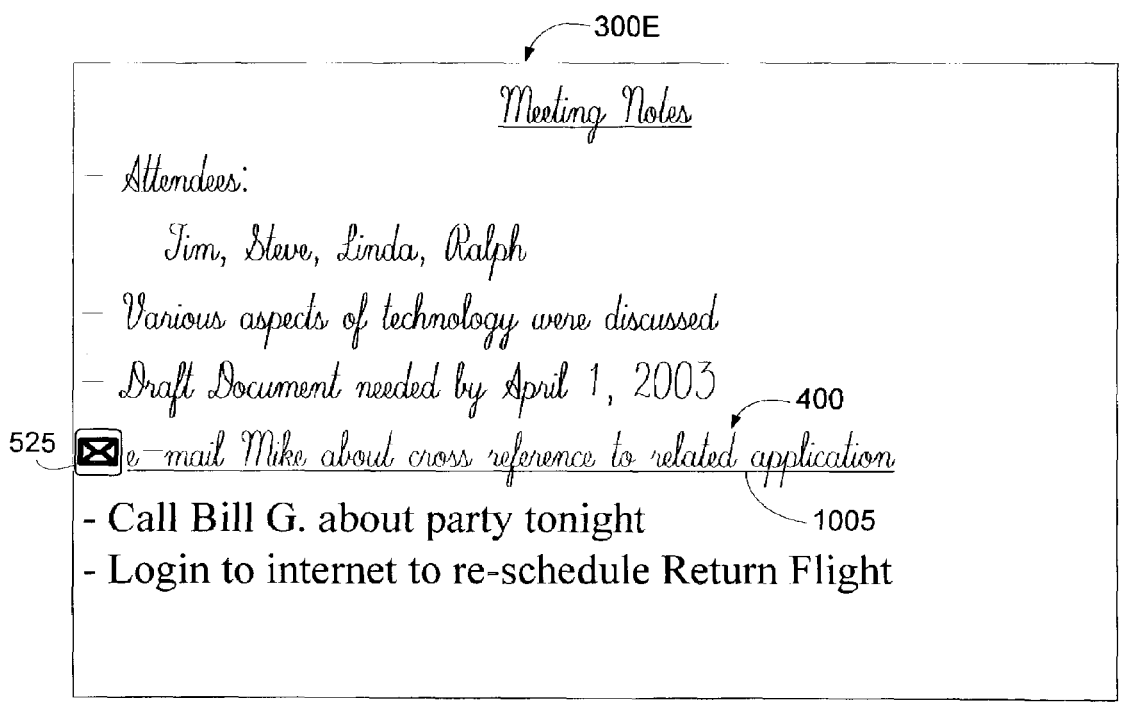
FIG. 10 is an exemplary display screen that illustrates the activation of a particular note flag selected by a user for a particular note that is positioned within a group of notes on a display device according to one exemplary embodiment of the present invention.

Referring now to FIG. 10, this figure illustrates an exemplary display screen 300E in which an activation of a note flag is illustrated. Specifically, in the exemplary display screen 300E, the selected e-mail note 400 has been "flagged" with the e-mail note flag type 505 by displaying the first icon 525 comprising an envelope adjacent to the selected note 400. The e-mail note flag type 520 has been formatted such that data of the selected note 400 is underlined by the line 1005. And for this particular e-mail note flag type 520, the highlight bar feature has been turned off or deactivated. In other words, a color has not been selected for the highlight bar or background option for this version of the e-mail note flag type 520.

Figure 11:
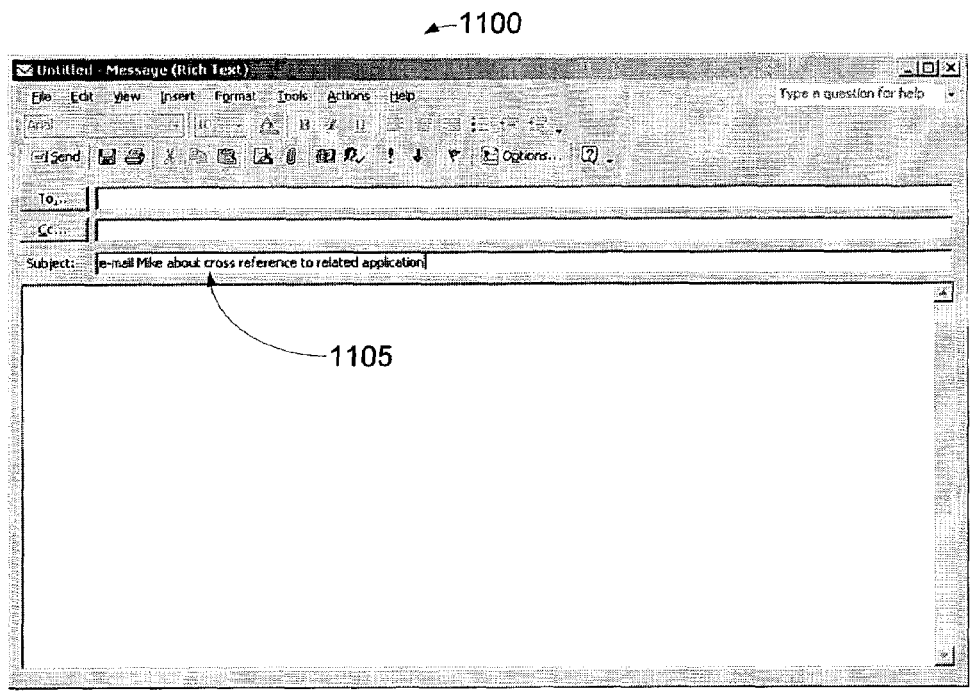
FIG. 11 is an exemplary display screen that illustrates a response by another application program in connection with the activation of an exemplary e-mail note flag according to another exemplary embodiment of the present invention.

Referring now to FIG. 11, this figure illustrates an exemplary display 1100 that can be generated in response to an activation of a particular note flag. Exemplary display 1100 can comprise a new e-mail message that is generated in response to the activation of the selected e-mail note flag. In other words, exemplary display 1100 that comprises an unsent, new e-mail can correspond to the activation of an e-mail note flag type such as the ones illustrated in FIGS. 5, 6 and 8. The content of the selected e-mail note 400 that corresponds to the e-mail note flag 520 has been copied and pasted into the subject line 1105 of the unsent, new e-mail message. By generating display 1100 and presenting it immediately after tagging a particular note, a workload of a user can be significantly reduced. Similarly, when a note flag is activated, it can initiate an operation within the current document supporting the notes instead of or in addition to initiating an operation in another application program. For example, a user could associate a note flag with an action of taking a note and displaying it in a special window adjacent to a window that is currently receiving note data.

Those skilled in the art will appreciate that initiating an operation within a document editing application program or in an application program other than a document editing application program with a note flag can be efficient in some instances while in other instances such activation of a note flag may be counter productive. For example, if a user was taking notes during a meeting, it may be counterproductive to initiate an operation in another application program such as an e-mail messaging program or opening a modal feature within the document editing program while the user is trying to record notes of a meeting. Therefore, this particular feature of initiating an operation within the document editing program or in an other application program with a note flag can be turned off or such functionality can be assigned to a special tool bar in which a user can select after notes have been "flagged" in order to initiate the operations.

Those skilled in the art also recognize that the present invention is not limited to associating a note flag with an e-mail operation. As mentioned previously, a user can associate a note flag with a calendar operation or operations within the application program supporting the notes and note flags. The aforementioned e-mail item and calendar item operations associated with a particular note flag are also for illustrative purposes only. The present invention can link note flags to any types of action or functionality of within the document editing module 205 or another application program relative to the document editing module 205 that can capture either electronic ink or typed text or both.

Figure 12:
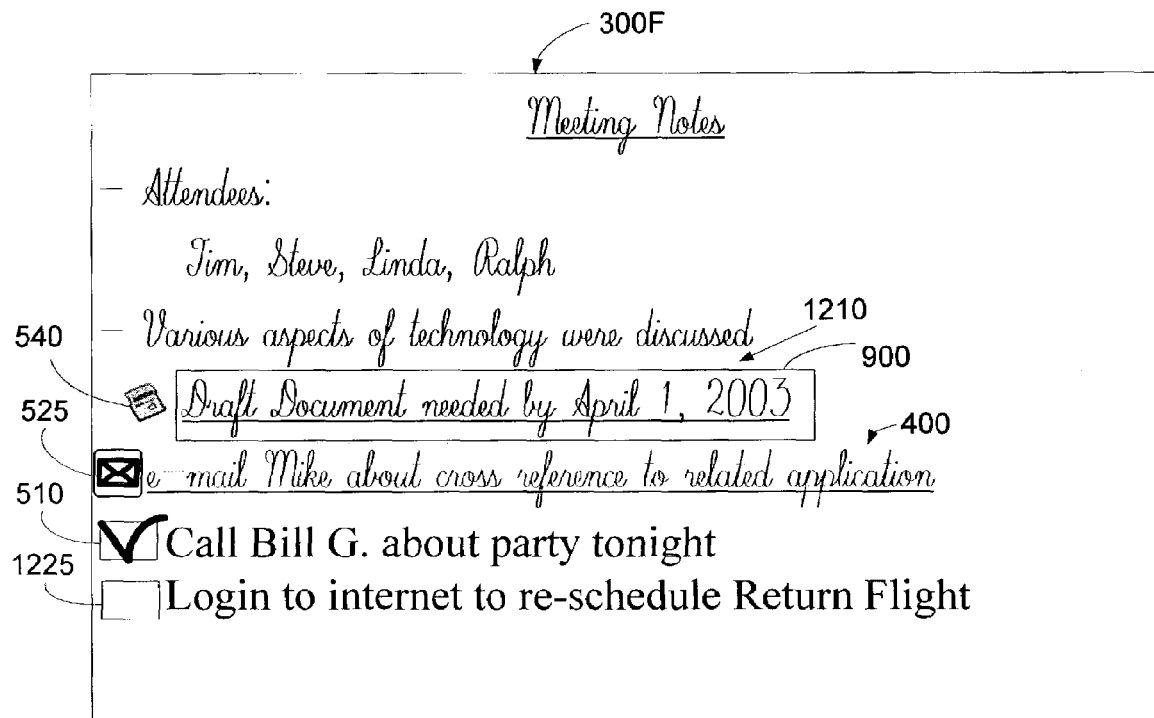
FIG. 12 is an exemplary display screen that illustrates how different types of note flags can visually distinguish a first set of notes from a second set of notes as well as visually distinguishing one set of note flags from another set of note flags according to an exemplary embodiment of the present invention.

Referring now to FIG. 12, this figure illustrates an exemplary display 300F in which several different notes have been "flagged" with different types of note flags. A "draft document" note 900 has been flagged with the third icon 540 and has been circumscribed or enveloped by a highlight bar 1210 and underlined with a line 1205 to indicate that this first note 900 is a calendar item. This means, for each note that is designated by a user as a calendar item, the corresponding note will be associated with the third icon 540. And the note data for the "calendar item" will be highlighted or enveloped or circumscribed by highlight bar 1210 and underlined with a line 1205.

Similarly, and as noted above, the second e-mail note 400 has been "flagged" with the second icon 525 and has been underlined by a second line 1215 to indicate that the second note 400 is an e-mail item.

For the third note 1220, the first icon 510 has been used to flag this note in order to indicate visually that this third note 1220 is an action item. A fourth icon 1225 has also been used to flag a fourth note 1230 to indicate that this note 1230 is an "open" or "uncompleted" action item meaning that the fourth icon 1225 does not include a "check" mark. After the user completes the action required by the fourth note 1230, the fourth icon 1225 can be "checked" by the user such that it transforms itself into the first icon 510. It is noted that for the second e-mail note 400, the highlight bar or highlight feature is not activated or has been turned off by user. Similarly, for the third note 1220 and fourth note 1230, a user did not activate or the user turned off the highlight bar features as well as the underline feature. While not illustrated in the present figure, the highlight color as well as the text color "particular" note flag type can be selected by a user. Further details of these aspects will be described with respect to FIGS. 14 and 15 discussed below.

Figure 13:
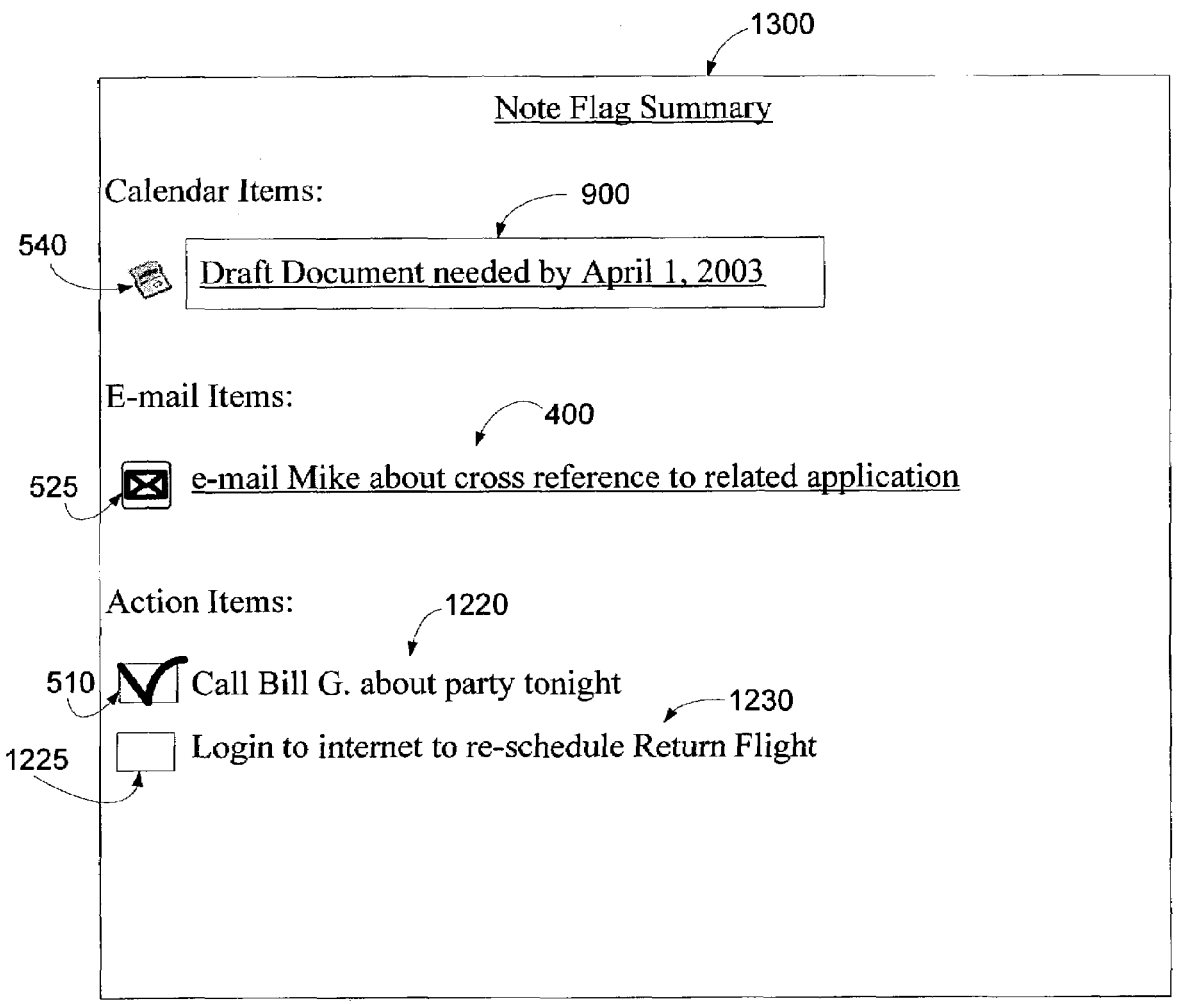
FIG. 13 is an exemplary display screen that illustrates a note flag summary that extracts note flags and their associated text from a page of notes being created by a user according to one exemplary embodiment of the present invention.

Referring now to FIG. 13, this figure illustrates an exemplary display 1300 comprising a note flag summary where only notes that have been flagged by the user are displayed. Exemplary display 1300 is generated by extracting the flagged notes from the exemplary display 300F of FIG. 12 and the associated note data. The other notes which are not flagged in FIG. 12 such as the "attendees" and "various aspects" notes are not displayed in the note flag summary since they were not "flagged" with note flags.

According to one exemplary aspect of the present invention, a user could initiate an operation in another application program by "double clicking" on the notes contained within the note flag summary display 1300. In this way, when a user is generating notes that are part of the display 300F illustrated in FIG. 12, the operations associated with each particular flag selected by the user are only carried out when the user selects the notes or note flags from the note flag summary display 1300. In this way, a user can control the initiation of an operation in another application program while creating a series or set of notes.

Figure 14:
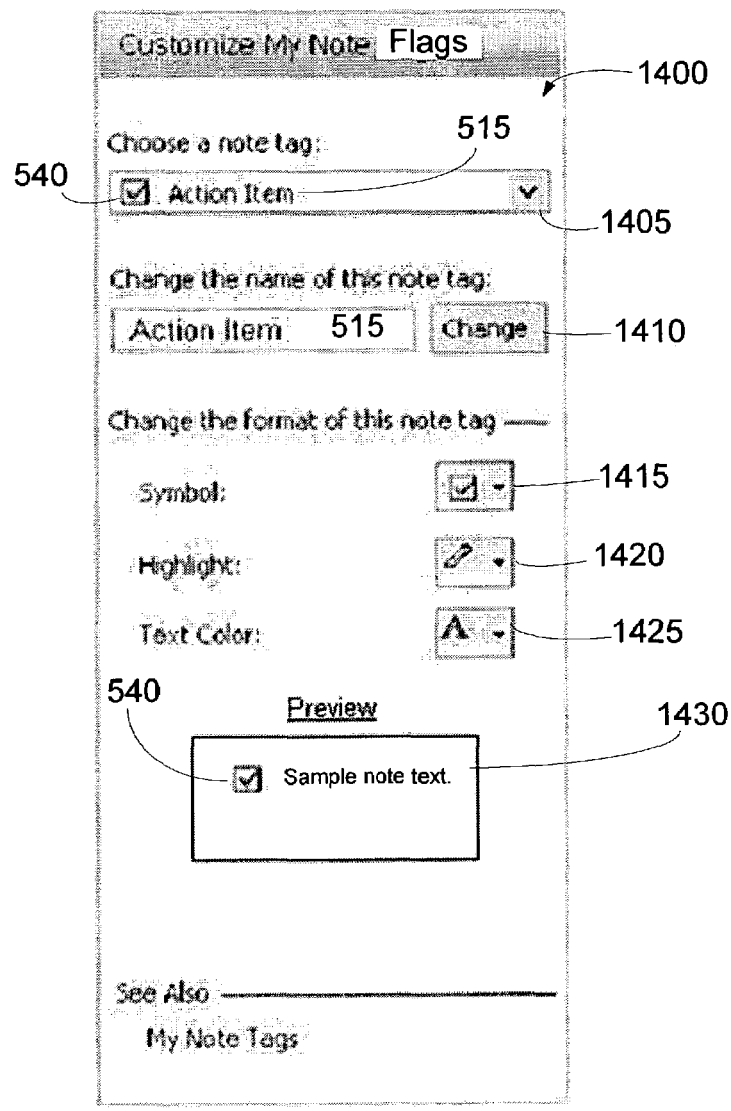
FIG. 14 is an exemplary graphical user interface for customizing note flags according to one exemplary embodiment of the present invention.

Referring now to FIG. 14, this figure illustrates a graphical user interface (GUI) 1400 for customizing note flags that can be generated by the document editing module 205 working with the graphical user interface manager 209. The GUI 1400 can comprise a note flag selection button 1405 in which a user can select a particular note flag out of the nine available note flags in order to customize the note flag icon 540 as well as the textual description 515 of a note flag. To change the text description 515 of a particular note flag, the user can insert text within a box 1412 and then select a change text button 1410.

The graphical user interface may further comprise a symbol change button 1415, a text highlight color change button 1420 and a text color change button 1425. The text highlight color change button 1420 permits a user to select a color of a highlight bar after the note has been "flagged" with a particular note flag. The text color change button 1425 permits a user to select a color of the text of note after the note has been "flagged" with a particular note flag. After selecting a format for a particular feature of a note flag, a preview screen 1430 can illustrate what a particular note flag will look like after the various features have been selected.

Figure 15:
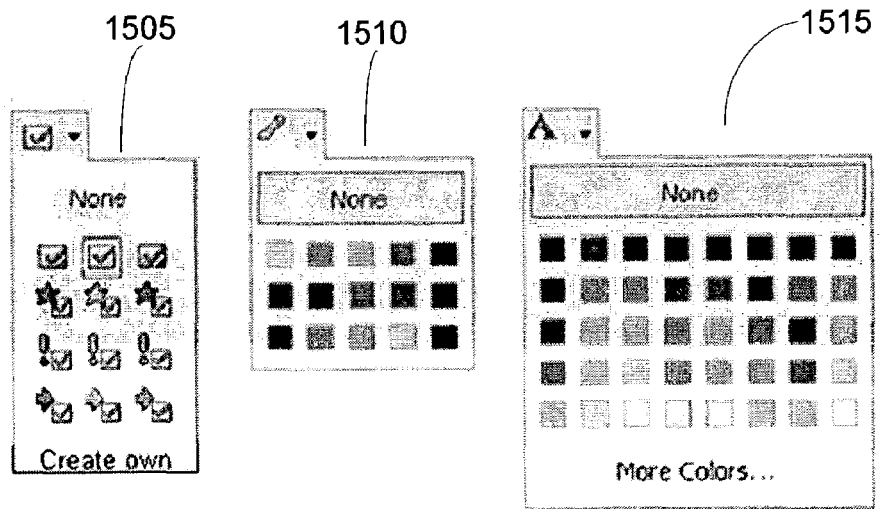
FIG. 15 illustrates various sub menus that can be generated in response to selections made in the graphical user interface of FIG. 14 according to one exemplary embodiment of the present invention.

Referring now to FIG. 15, this figure illustrates various submenus 1505, 1510, and 1515 that can be generated in response to selecting the symbol of change button 1415, the text highlight color change button 1420, and text color change button 1425 of FIG. 14. Specifically the first submenu 1505 can comprise the various options for changing the symbol or icon associated with a particular note flag. The submenu 1505 can further comprise a "create own" option 1520 in which a user can create his or her own unique symbol or icon to be associated with a particular note flag. Upon selecting the "create own" option 1520, the user can specify a file location for the icon or symbol to be associated with the selected note flag.

The second submenu 1510 can comprise various colors that can be selected by a user for a highlight bar that will be applied to text adjacent to a selected note flag. The third submenu 1515, can comprise various colors for text of a note when a particular note flag is activated. Those skilled in the art will recognize that additional formatting options are not beyond the scope and spirit of the present invention. As explained above with respect to some previous figures, a user could select the font for text when a note is "flagged" with a particular note flag. For example, the text of a particular note could be bolded or underlined when a note flag is activated.

Exemplary Method for Tagging Notes and Customizing Note Flags

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 16:
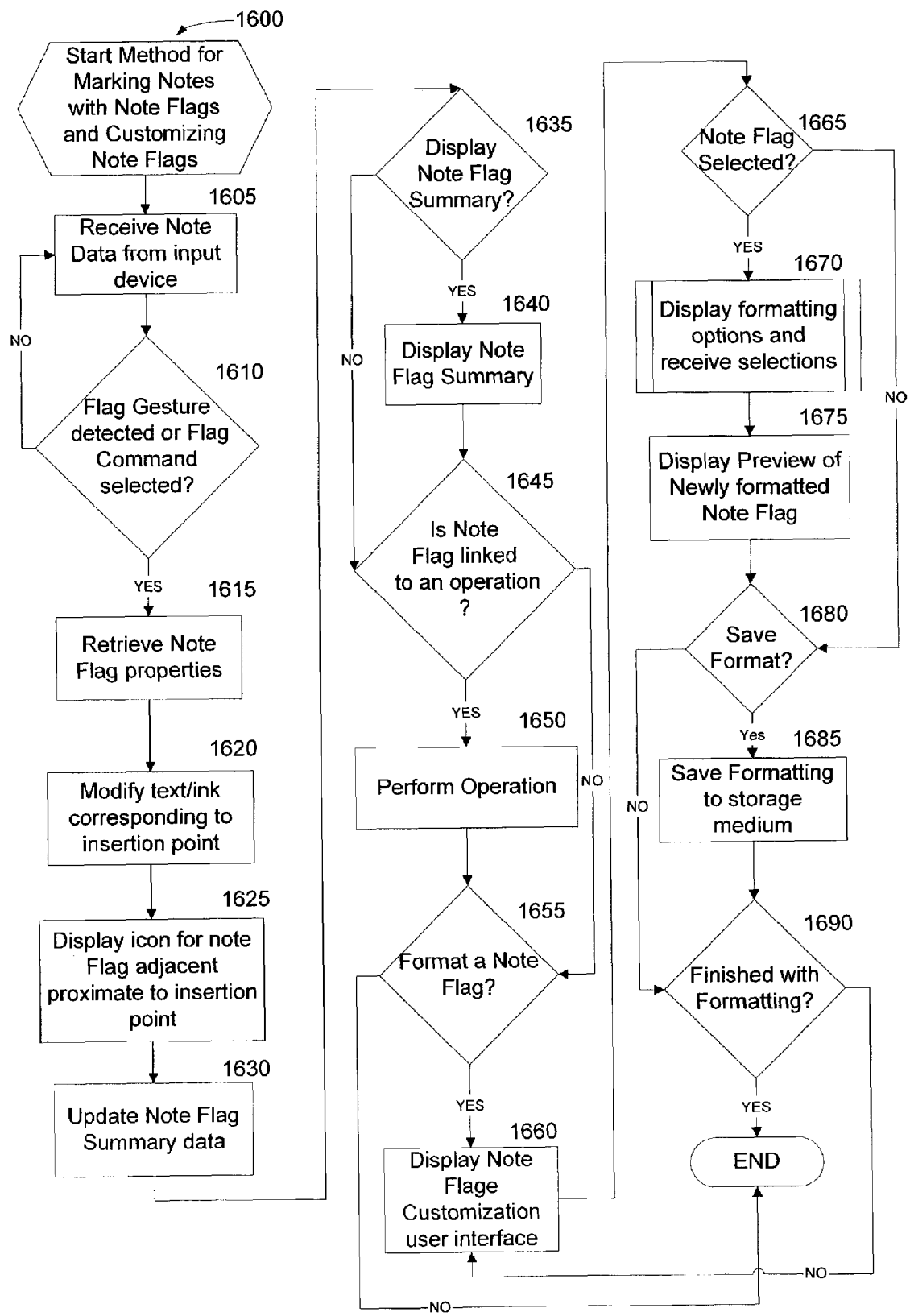
FIG. 16 is a logic flow diagram illustrating an overview of an exemplary process for marking notes with flag and for customizing these flags according to one exemplary embodiment of the present invention.

Referring now to FIG. 16, this figure illustrates an exemplary method 1600 for marking notes with note flags and customizing note flags. The method or process 1600 starts with a first step 1605 in which a document editing module 205 receives note data from an input device such as a tablet 250 or keyboard 360. Note data can comprise at least one of typewritten text as well as handwritten text in the form of electronic ink. Next, in step 1610, the document editing module 205 can detect whether a flag gesture 800 has been created or if a note flag command has been selected by user. If the inquiry to decision step 1610 is negative, then the "NO" branch is followed back to step 1605. If the inquiry to decision step 1610 is positive, then the "YES" branch is followed to step 1615 in which the document editing module 205 retrieves the particular features of a selected note flag from the registry keys 207 stored within the windows operating system 135.

Next, in step 1620, the document editing module can modify the text or ink as needed corresponding to a selected note or insertion point in accordance with the note flag features retrieved from the registry keys 207. Specifically, note data that already exists can be selected or "flagged", and then the document editing module 205 can modify the text or ink of the note data according features of the selected note flag. However, if note data does not exist, when a note flag is selected, the subsequent note data positioned after the note flag will be formatted according to the features of the selected note flag.

In step 1625, the documenting editing module 205 can display the icon for the selected note flag adjacent to the existing note data. Alternatively, if note data has not been created, the icon for the selected note flag can be positioned proximate to the last insertion point.

Next in step 1630, the document editing module 205 can update the note flag summary display 1300 with the note data corresponding to the selected note flag. In decision step 1635, the document editing module 205 can determine whether a user has selected to display the note flag summary 1300. If the inquiry to decision step 1635 is positive, then the "YES" branch is followed to step 1640. In step 1640, the note flag summary 1300 is displayed.

If the inquiry to decision step 1635 is negative, then the "NO" branch is followed to decision step 1645 in which it is determined whether the selected note flag is linked to an operation within the document editing module 205 or within another application program (or both). For decision step 1645, this step can also correspond to whether the user desires a particular note flag to initiate an operation within the document editing module 205 or within another application program relative to the document editing module 205. As noted above, according to one aspect of the present invention, the note flags displayed in the note flag summary display 1300 can be "hot" links that can initiate operations within the document editing module 205 or in other application programs relative to the document editing module 205.

If the inquiry to decision step 1645 is positive, then the "YES" branch is followed to step 1650 in which the document editing module 205 can initiate commands within the document editing module 205 or make calls to APIs for a particular application program outside of the document editing module. The APIs can then initiate the action in another application program relative to the document editing module 205 and corresponding to a selected note flag. If the inquiry to decision step 1645 is negative, then the "NO" branch is followed to decision step 1655.

In decision step 1655, the document editing module 205 determines whether a format note flag change command has been selected by a user. If the inquiry to decision step 1655 is negative, then the "NO" branch is followed in which the process ends.

If the inquiry to decision step 1655 is positive, then the "YES" branch is followed to step 1660 in which the note flag customization GUI 1400 as illustrated in FIG. 14 is displayed. Next, in decision step 1665, it is determined whether a particular note flag has been selected. If the inquiry to decision step 1655 is negative, then the "NO" branch is followed to decision step 1690. If the inquiry to decision step 1655 is positive, then the "YES" branch is followed to routine 1670.

In routine 1670, the formatting options for the selected note flag are retrieved by the document editing module 205 and displayed. Selections made by the user are then received by the document editing module 205. Further details of routine 1670 will be discussed below with respect to FIG. 17.

After routine 1670, in step 1675, a preview 1430 of the newly formatted note flag is displayed with the graphical user interface 1400 as illustrated in FIG. 14. Next, in decision step 1680, it is determined whether the changes to the format of the selected note flag are desired to be saved. If the inquiry to decision step 1680 is negative, then the "NO" branch is followed to decision step 1690. If the inquiry to decision step 1680 is positive, then the "YES" branch is followed to step 1685 in which the formatting of the selected note flag is saved on a storage medium such as storage device 125 or 127.

Next, in decision step 1690, the document editing module 205 determines whether a user is finished with formatting note flags. If the inquiry to decision step 1690 is negative, then the "NO" branch is followed back to step 1660. If the inquiry to decision step 1690 is positive, then the "YES" branch is followed in which the process then ends.

Figure 17:
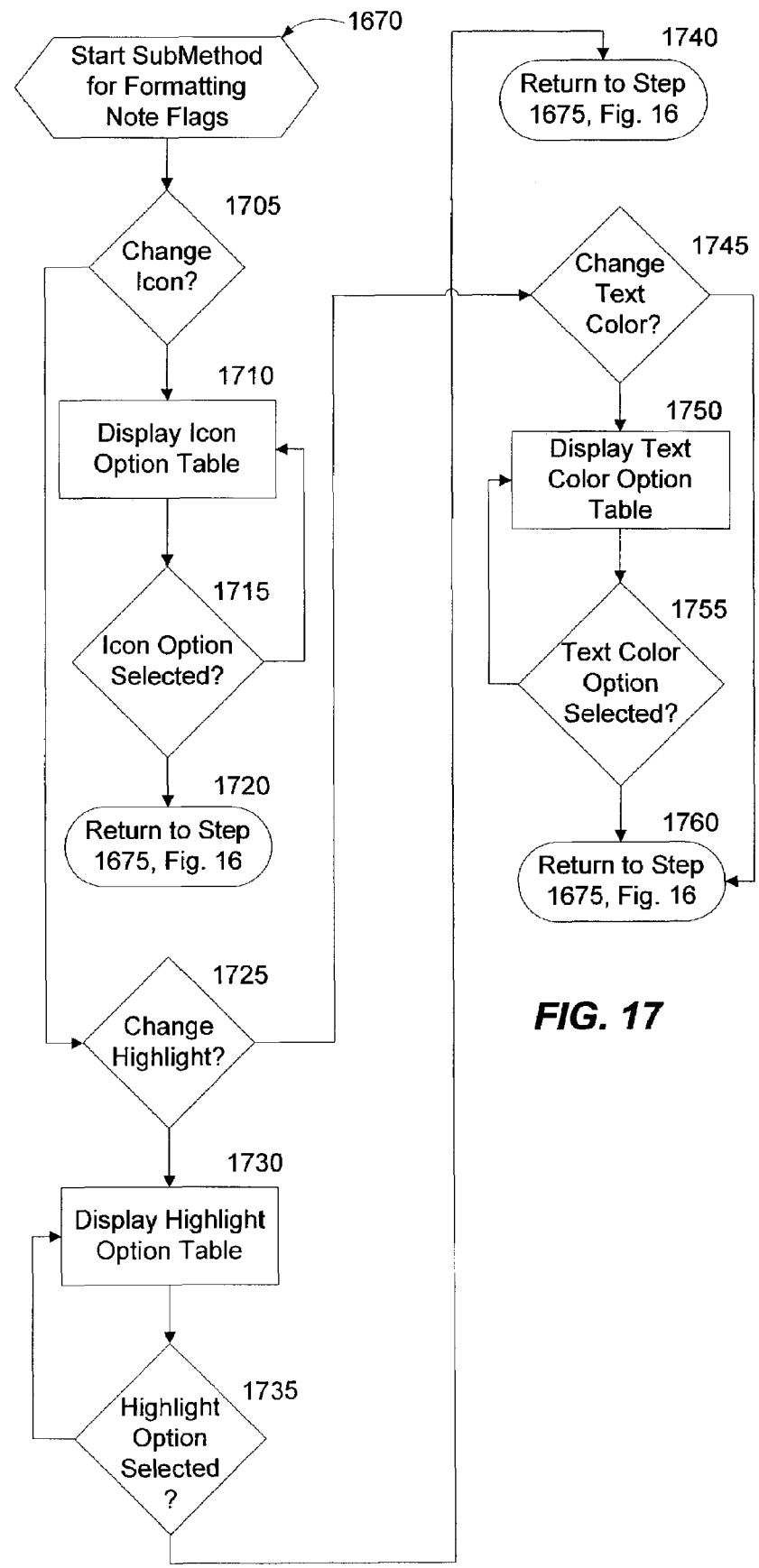
FIG. 17. is a logic flow diagram illustrating a sub method for formatting flags according to one exemplary embodiment of the present invention.

Referring now to FIG. 17, this figure illustrates an exemplary submethod 1670 for display formatting options and receiving selections for formatting note flags according to an exemplary embodiment of the present invention. Routine 1670 starts with decision step 1705 in which it is determined whether a change icon or symbol button 1415 has been selected. If the inquiry to decision step 1705 is positive, then the "YES" branch is followed to step 1710 in which an icon option table or submenu 1505 is displayed. Next, in step 1715, it is determined whether an icon option has been selected from the submenu 1505. If the inquiry to decision step 1715 is negative, then the "NO" branch is followed back to step 1710. If the inquiry to decision step 1715 is positive, then the "YES" branch is followed to step 1720 in which the process returns to step 1675 in FIG. 16.

If the inquiry to decision step 1705 is negative, then the "NO" branch is followed to decision step 1725 in which it is determined whether a change highlight button 1420 has been selected. If the inquiry to decision step 1725 is positive, then the "YES" branch is followed to step 1730 in which the highlight option table or submenu 1510 is displayed. Next, in decision step 1735 it is determined whether a highlight option has been selected from the submenu 1510. If the inquiry to decision step 1735 is negative, then the "NO" branch is followed back to step 1730. If the inquiry to decision step 1735 is positive, then the "YES" branch is followed to step 1740 in which the process returns to step 1675 of FIG. 16.

If the inquiry to decision step 1725 is negative, then the "NO" branch is followed to decision step 1745. In decision step 1745 it is determined whether the change text color button 1425 has been selected. If the inquiry to decision step 1745 is negative, then the "NO" branch is followed to step 1760 in which the process returns to step 1675 of FIG. 16.

If the inquiry to decision step 1745 is positive, then the "YES" branch is followed to step 1750 in which text color option table or submenu 1515 is displayed. Next, in decision step 1755 it is determined whether a text color option has been selected from the submenu 1515. If the inquiry to decision step 1755 is negative, then the "NO" branch is followed back to step 1750. If the inquiry to decision step 1755 is positive, then the "YES" branch is followed to step 1760 in which the process returns to step 1675 of FIG. 16. As noted above, those skilled in the art will recognize that other features or options for customizing the look and "feel" of note flags are not beyond the scope and spirit of the present invention.

Alternative Embodiments

In one exemplary embodiment not illustrated, a user can select or make the association between a note flag and a particular application program in which an operation will be carried out in response to activation of a note flag. That is, a user can assign an operation of an application program to a particular note flag. This means that a user can "customize" the operations associated with a particular note flag. Further, a user could also assign a series of operations similar to macros in response to the activation of a particular note flag. Those skilled in the art will recognize that any number of operations in application programs different from the document editing module 205 could be assigned to a particular note flag.

CONCLUSION

The method and system for customizing note flags allows a user to customize the look or "feel" of a note flag. A user is provided with several options in order to create note flags that are visually distinguishable from one another. The method and system also links note flags with a particular action within a program supporting the note flags such as the document editing module 205 or in another application program relative to a document editing module 205.

What is claimed is:

1. A computer-implemented method for customizing note flags comprising:
receiving notes from an input device;
selecting a note;
receiving an ink gesture; wherein the ink gesture received is inked in a shape of a note flag on a display;
automatically processing the received ink gesture to determine the shape of the note flag that was inked on the display; wherein processing the received ink gesture comprises comparing the shape of the received ink gesture to a shape for each of the note flags until a match is found;
automatically selecting a note flag whose shape matches the shape of the note flag that was inked on the display; wherein each note flag is associated with a different shape;
displaying formatting options for the selected note flag;
displaying a preview of changes made to the selected note flag;
saving changes made to the selected note flag on storage medium; and
displaying a note flag summary; wherein displaying the note flag summary comprises extracting each note that has an associated note flag; and displaying the extracted notes with each associated note flag separately from a display of the notes and initiating action in another application program in response to determining that the note flag is selected within the note flag summary.

2. The method of claim 1, further comprising determining if a change to an icon associated with the selected note flag is desired.

3. The method of claim 2, further comprising displaying Icon options for the selected note flag.

4. The method of claim 2, further comprising displaying Icon options for the selected note flag in a table format.

5. The method of claim 3, further comprising receiving a selection of an icon option.

6. The method of claim 1, further comprising determining if a change in a highlight color for text corresponding to a note flag is desired.

7. The method of claim 6, further comprising displaying highlight options for the selected note flag.

8. The method of claim 6, further comprising displaying highlight options for the selected note flag in a table format.

9. The method of claim 7, further comprising receiving a selection of a highlight option.

10. The method of claim 1, further comprising determining if a change in color for text corresponding to a note flag is desired.

11. The method of claim 10, further comprising displaying color options for the selected note flag.

12. The method of claim 10, further comprising displaying color options for the selected note flag in a table format.

13. The method of claim 7, further comprising receiving a selection of a color option.

14. A computer-implemented method for distinguishing a first set of notes from a second set of notes, comprising:
receiving note data from an input device; wherein the note data comprises notes;
receiving a note flag ink gesture; wherein the note flag ink gesture is inked in a shape of a note flag;
automatically processing the received ink gesture to determine the note flag that was inked;
automatically selecting a note flag from determining the shape of the note flag ink gesture that was inked; wherein each note flag is associated with a different shape;
automatically displaying the note flag adjacent to note data in response to detecting the note flag ink gesture that is in the shape of the note flag; wherein the note flag that is displayed adjacent to the note data is in the shape of the received ink gesture;
determining if the note flag is associated with an operation of one of a program;
supporting the note flag and another application program; and
displaying a note flag summary; wherein displaying the note flag summary comprises extracting each note within the note data that has an associated note flag; and displaying the extracted notes with each associated note flag separately from a display of the note data and initiating action in another application program in response to determining that the note flag is selected within the note flag summary.

15. The method of claim 14, further comprising modifying at least one of text and ink adjacent to an insertion point.

16. The method of claim 15, wherein modifying comprises highlighting the at least one text and ink with predetermined color.

17. The method of claim 15, wherein modifying comprises changing a color of the at least one text and ink.

18. A computer system for marking notes with note flags and customizing note flags, comprising:
a processing unit;
a memory storage device;
a display device coupled to the processing unit for displaying data; and
a program stored in the memory storage device for providing instructions to the processing unit,
the processing unit responsive to the instructions of the program, operable for:
receiving notes;
receiving an ink gesture; wherein the ink gesture received is in a shape of a note flag;
automatically processing the received ink gesture to determine the note flag that was inked; wherein processing the received ink gesture comprises comparing the shape of the received ink gesture to a shape for each of the note flags until a match is found;
automatically selecting a note flag from determining the shape of the ink gesture that was inked;
wherein each note flag is associated with a different shape;
automatically positioning the note flag adjacent to one of the notes;
receiving a command to change a formatting of a note flag;
displaying formatting options for a note flag; and
displaying a note flag summary; wherein displaying the note flag summary comprises extracting each note that has an associated note flag; and displaying the extracted notes with each associated note flag separately from a display of the notes without associated note flags.

19. The method of claim 18, further comprising displaying a preview of changes selected for a note flag.

20. The method of claim 19, further comprising saving changes made to a selected note flag on storage medium.

* * * * *